US012773902B2

(12) United States Patent
Shimatani et al.

(10) Patent No.: US 12,773,902 B2
(45) Date of Patent: Oct. 27, 2026

(54) VEHICLE

(71) Applicant: KAWASAKI MOTORS, LTD., Hyogo (JP)

(72) Inventors: Kengo Shimatani, Akashi (JP); Takahiro Jyouzaki, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 554 days.

(21) Appl. No.: 18/233,396

(22) Filed: Aug. 14, 2023

(65) Prior Publication Data

US 2024/0157781 A1 May 16, 2024

Related U.S. Application Data

(63) Continuation-in-part of application No. 17/314,587, filed on May 7, 2021, now Pat. No. 11,919,587.

(51) Int. Cl.
*B60K 5/04* (2006.01)
*B60K 13/02* (2006.01)
(Continued)

(52) U.S. Cl.
CPC ................ *B60K 13/02* (2013.01); *B60K 5/04* (2013.01); *B62D 25/105* (2013.01); (Continued)

(58) Field of Classification Search
CPC .......... B60K 13/02; B60K 13/04; B60K 5/04; B60K 11/06; B60K 2005/003; (Continued)

(56) References Cited

U.S. PATENT DOCUMENTS 3,820,327 A 6/1974 Henault
6,832,872 B2 12/2004 Koelm et al.
(Continued)

FOREIGN PATENT DOCUMENTS

CN 1045664327 4/2015
DE 10 2004 009 376 9/2004
(Continued)

OTHER PUBLICATIONS

Office Action issued Dec. 2, 2024 in U.S. Appl. No. 17/693,739.
Office Action issued Jan. 23, 2026 in U.S. Appl. No. 18/418,778.

*Primary Examiner* — Tinh T Dang
(74) *Attorney, Agent, or Firm* — Wenderoth, Lind & Ponack, L.L.P.

(57) ABSTRACT

A vehicle includes a vehicle body floor, a bonnet space located on the front side in a vehicle front-rear direction with respect to the vehicle body floor, a first conduit extending from the bonnet space toward the rear side in the vehicle front-rear direction below the vehicle body floor, the first conduit including a first conduit front portion and a first conduit rear portion located on the rear side with respect the first conduit front portion, and a second conduit extending from the bonnet space toward the rear side in the vehicle front-rear direction below the vehicle body floor, the second conduit including a second conduit front portion and a second conduit rear portion located on the rear side with respect the second conduit front portion. The first conduit rear portion and the second conduit rear portion are arranged in a vehicle vertical direction below the vehicle body floor.

8 Claims, 11 Drawing Sheets

(51) Int. Cl.

| | |
|---|---|
| ***B62D 25/10*** | (2006.01) |
| ***B62D 25/20*** | (2006.01) |
| ***F01N 13/08*** | (2010.01) |
| ***F02M 35/10*** | (2006.01) |
| ***F16H 57/02*** | (2012.01) |

(52) U.S. Cl.

CPC ... *B62D 25/2018* (2013.01); *F02M 35/10144* (2013.01); *F01N 13/08* (2013.01); *F16H 2057/02056* (2013.01)

(58) Field of Classification Search

CPC .. B60K 11/02; B60K 11/04; F02M 35/10144; F02M 35/02; F02M 35/10; F16H 37/021; F16H 57/035; F16H 57/0416; F16H 57/0417; F16H 57/0489; F16H 2057/0203; F16H 2057/02056; B62D 25/105; B62D 25/2018; B62D 33/02; F01N 13/08; F01N 2340/04; B60Y 2200/20; B60Y 2400/72

See application file for complete search history.

(56) References Cited

U.S. PATENT DOCUMENTS

| | | | | |
|---|---|---|---|---|
| 7,059,071 | B2 | 6/2006 | Hanafusa et al. | |
| 7,191,753 | B2 | 3/2007 | Sagara et al. | |
| 8,439,141 | B2 | 5/2013 | Bessho et al. | |
| 10,124,659 | B2 | 11/2018 | Bessho et al. | |
| 10,704,438 | B2 | 7/2020 | Swab | |
| 10,920,639 | B2 | 2/2021 | Kurasawa et al. | |
| 11,434,981 | B2 | 9/2022 | Oyama et al. | |
| 2006/0011401 | A1 | 1/2006 | Nakamura et al. | |
| 2007/0227793 | A1 | 10/2007 | Nozaki | |
| 2010/0186395 | A1 | 7/2010 | Yang et al. | |
| 2011/0099990 | A1 | 5/2011 | Lang et al. | |
| 2011/0239636 | A1 | 10/2011 | Brunet et al. | |
| 2015/0128578 | A1 | 5/2015 | Helferich | |
| 2016/0332676 | A1* | 11/2016 | Miller | B60G 3/20 |
| 2020/0122560 | A1 | 4/2020 | Ward et al. | |
| 2020/0208731 | A1* | 7/2020 | Matsudo | B60K 35/50 |
| 2021/0062704 | A1* | 3/2021 | Itoigawa | F02P 13/00 |
| 2022/0355877 | A1 | 11/2022 | Jyouzaki | |
| 2022/0356939 | A1 | 11/2022 | Shimatani et al. | |
| 2024/0239184 | A1 | 7/2024 | Tokuda et al. | |

FOREIGN PATENT DOCUMENTS

| | | |
|---|---|---|
| WO | 2004/078571 | 9/2004 |
| WO | 2013/079523 | 6/2013 |
| WO | 2018/030110 | 2/2018 |
| WO | 2018/030302 | 2/2018 |

* cited by examiner

VEHICLE

BACKGROUND OF THE INVENTION

Technical Field

The present disclosure relates to a vehicle.

Related Art

US 2016/0332676 A1 discloses a utility vehicle. The utility vehicle has an intake assembly including a first conduit defining a first flow path fluidly coupled to an engine and a second conduit defining a second flow path coupled to a CVT.

SUMMARY

In the utility vehicle, the first conduit and the second conduit are laterally aligned and extend from a front portion of a vehicle body to a rear portion of the vehicle body, so that the intake assembly is likely to be large in size in a vehicle left-right direction.

An object of the present disclosure is to provide a vehicle including a plurality of intake conduits extending rearward from a front portion of a vehicle body, in which a plurality of the intake conduits are configured to be compact in a vehicle left-right direction.

The present disclosure provides a vehicle including a vehicle body floor, a bonnet space located on the front side in a vehicle front-rear direction with respect to the vehicle body floor, a first conduit extending from the bonnet space toward the rear side in the vehicle front-rear direction by passing below the vehicle body floor, the first conduit including a first conduit front portion located on the front side and a first conduit rear portion located on the rear side with respect to the first conduit front portion, and a second conduit extending from the bonnet space toward the rear side in the vehicle front-rear direction by passing below the vehicle body floor, the second conduit including a second conduit front portion located on the front side and a second conduit rear portion located on the rear side with respect to the second conduit front portion. The first conduit rear portion and the second conduit rear portion are arranged in a vehicle vertical direction below the vehicle body floor.

According to the present disclosure, since a space required for disposing the first conduit rear portion and the second conduit rear portion can be made compact in the vehicle left-right direction, the first conduit rear portion and the second conduit rear portion can be easily disposed below the vehicle body floor.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

A vehicle 100 according to an embodiment of the present disclosure will be described with reference to FIGS. 1 to 11. The vehicle 100 according to the present embodiment is a utility vehicle. In the description below, the front-rear direction, left-right direction, and vertical direction as seen from the driver will be referred to as the front-rear direction, left-right direction, and vertical direction of the vehicle 100 and each component.

Figure 1:
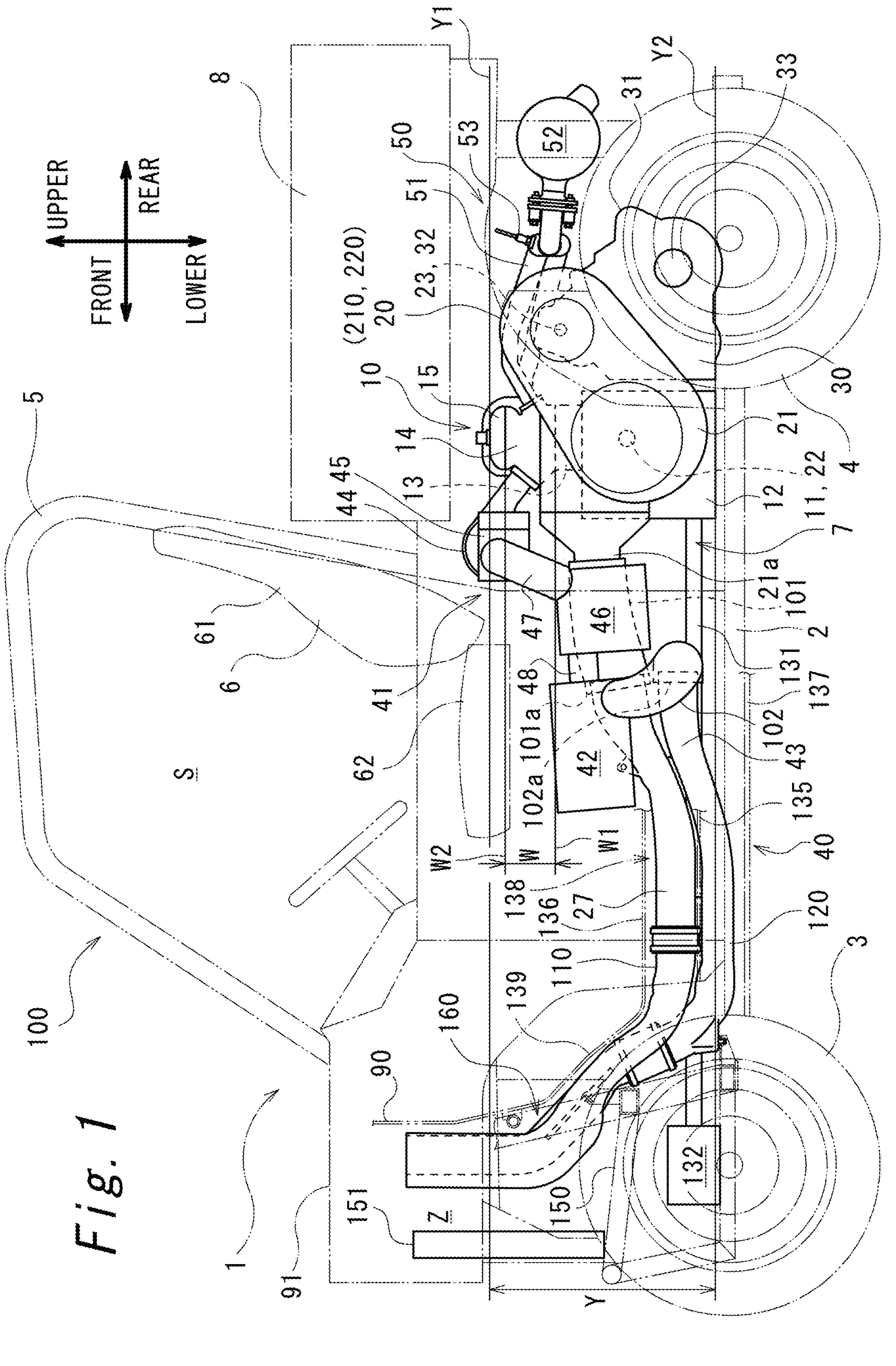
FIG. 1 is a left side view schematically illustrating a vehicle according to an embodiment of the present disclosure.

FIG. 1 is a left side view of the vehicle 100. As shown in FIG. 1, the vehicle 100 has a vehicle body 1 and a powertrain mechanism 7 mounted on the vehicle body 1. Note that, in FIG. 1, the vehicle body 1 is shown by a chain double-dashed line, and the powertrain mechanism 7 is shown by a solid line.

The vehicle body 1 includes a vehicle body frame 2 that constitutes a framework. In the vehicle body 1, a pair of left and right front wheels 3 are disposed on both sides of the front portion of the vehicle body frame 2, and a pair of left and right rear wheels 4 are disposed on both sides of the rear portion of the vehicle body frame 2. Riding space S is located between the front wheel 3 and the rear wheel 4. The riding space S is surrounded by a ROPS (Rollover Protective Structure) 5.

A seat 6 is disposed in the riding space S. The seat 6 includes a driver's seat 6A located on the left side of the riding space S and a passenger seat 6B located on the right side of the riding space S (see FIG. 2). The vehicle body 1 is provided with a cargo bed 8 behind the seat 6. Below the cargo bed 8, an engine body 10, a CVT (Continuously Variable Transmission) 20, and a transmission 30 that constitute the powertrain mechanism 7 are disposed. The vehicle 100 is configured such that the rotational torque output from the engine body 10 is changed in rotation speed by the CVT 20 and the transmission 30 and transmitted to the front wheels 3 and the rear wheels 4.

The powertrain mechanism 7 further includes a front wheel gear box 132 to which a part of rotational torque output from the transmission 30 is transmitted via a propeller shaft 131. The front wheel gear box 132 distributes rotational torque transmitted via the propeller shaft 131 to rotationally drive the left and right front wheels 3 via a drive shaft 133 (see FIG. 2).

The vehicle body frame 2 includes a seat frame 140 (see FIG. 11) that supports the seat 6 and a front frame 150 that supports the front wheel gear box 132. A radiator 151 is disposed at a front portion of the front frame 150. The vehicle body frame 2 supports a vehicle body floor 135 constituting a floor surface of the riding space S. The vehicle body floor 135 includes a tunnel 136 that bulges upward from a substantially central portion in a vehicle width direction and extends in the front-rear direction. Inside the tunnel 136, the propeller shaft 131 extends in the front-rear direction.

The vehicle body frame 2 is covered with an under cover 137 from below. A tunnel space 138 extending in the front-rear direction is formed between the under cover 137 and the tunnel 136. A pair of a first water pipe 152 and a second water pipe 153 (see FIG. 9) for circulating cooling water between the radiator 151 and the engine body 10 is disposed between the vehicle body floor 135 and the under cover 137. The first water pipe 152 is disposed below the propeller shaft 131 in the tunnel space 138.

Figure 2:
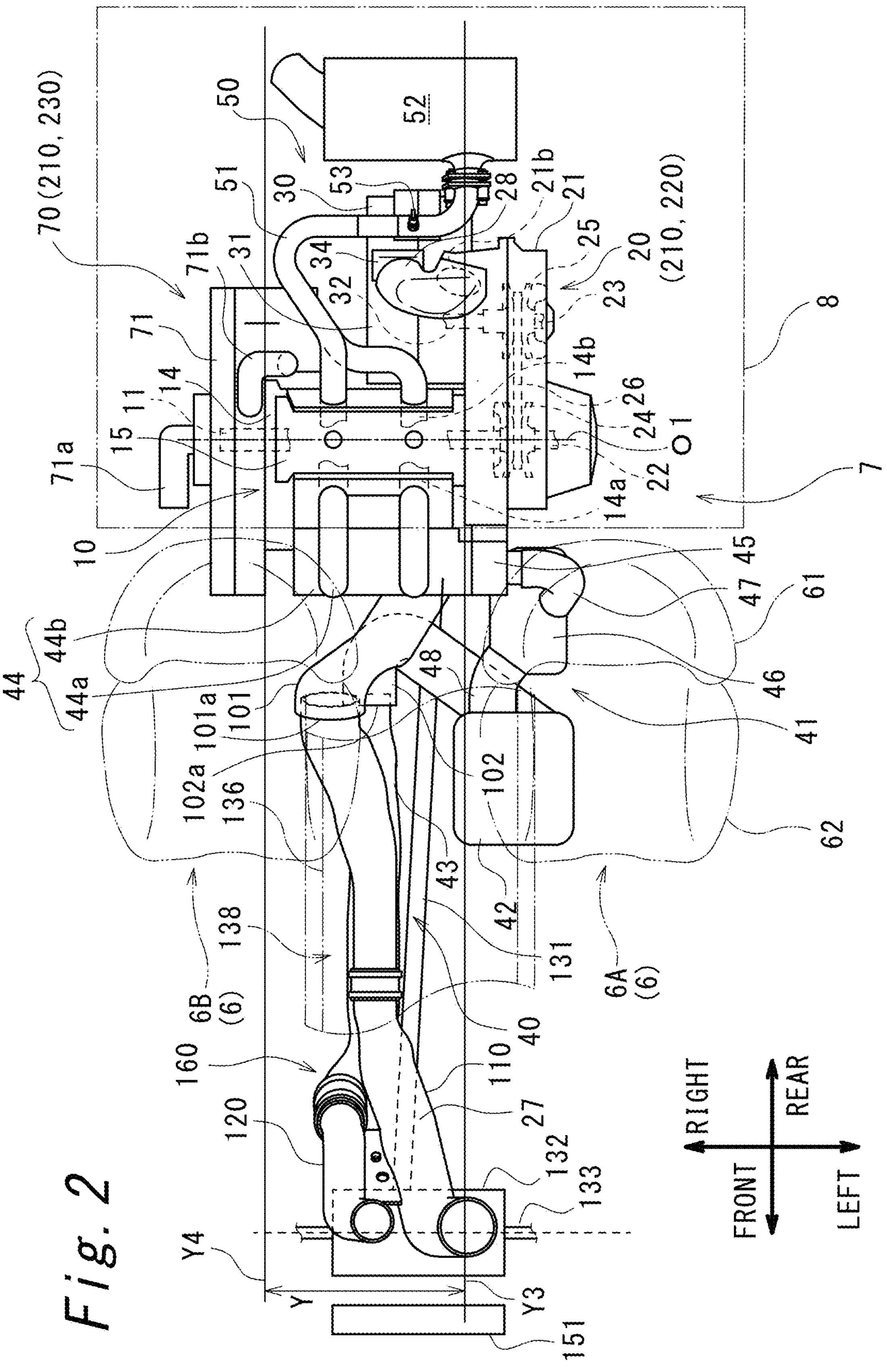
FIG. 2 is a top view schematically illustrating a powertrain mechanism.

Hereinafter, the powertrain mechanism 7 will be described. FIG. 2 is a top view of the powertrain mechanism 7. In FIG. 2, the seat 6 and the cargo bed 8 are both shown by a chain double-dashed line. With reference to FIG. 2 as well, the powertrain mechanism 7 further includes an intake system 40, an exhaust system 50, and an engine auxiliary unit 70 (see FIG. 6).

In the powertrain mechanism 7, the CVT 20 and the engine auxiliary unit 70 constitute a power transmission unit 210 of the present disclosure in which power is transmitted from the engine body 10. Further, the CVT 20 constitutes a driving force transmission unit 220 to which power from the engine body 10 is transmitted as a traveling driving force for driving the vehicle 100. Further, the engine auxiliary unit 70 constitutes an auxiliary transmission unit 230 in which power from the engine body 10 is transmitted as a driving force for an engine auxiliary 71 attached to the engine body 10.

The engine body 10 has a crankshaft 11 as an output shaft from which rotational torque is output. In the present embodiment, the engine body 10 is a four-cycle in-line two cylinder engine in which a central axis O1 of the crankshaft 11 extends in the vehicle width direction. The engine body 10 is not limited to a two cylinder engine, and may be a three or more cylinder engine and may be, for example, a four cylinder engine. The engine body 10 has a crankcase 12, a cylinder 13, a cylinder head 14, and a cylinder head cover 15 in this order from the bottom.

The crankcase 12 rotatably supports the crankshaft 11. The cylinder 13 is coupled to the upper surface of the crankcase 12. The cylinder head 14 is coupled to an upper surface of the cylinder 13 and has two intake ports **14*a* on the front side and two exhaust ports 14*b* on the rear side. The cylinder head cover 15 is fixed to the upper surface of the cylinder head 14**.

The CVT 20 (the power transmission unit 210 and the driving force transmission unit 220) is disposed adjacent to the left side of the engine body 10. The CVT 20 has a CVT housing 21 constituting an outer shell, and a CVT input shaft 22, a CVT output shaft 23, a drive pulley 24, a driven pulley 25, and an endless belt 26 accommodated inside the CVT housing 21.

The CVT input shaft 22 extends in the vehicle width direction and is connected to the crankshaft 11 so as to be able to transmit power. The CVT output shaft 23 extends in the vehicle width direction behind and above the CVT input shaft 22. The CVT 20 extends in a direction that is inclined upward toward the rear in a side view.

The drive pulley 24 is disposed on the CVT input shaft 22. The driven pulley 25 is disposed on the CVT output shaft 23. The endless belt (V belt) 26 is wound over between the drive pulley 24 and the driven pulley 25. In the CVT 20, the drive rotation inputted from the crankshaft 11 is transmitted to the CVT input shaft 22, has the speed changed through the drive pulley 24, the driven pulley 25, and the endless belt 26, and is output from the CVT output shaft 23.

The CVT housing 21 is provided with a CVT intake opening **21*a* in the front portion and a CVT exhaust opening 21*b* in the rear portion. The CVT intake opening 21*a* opens forward. The CVT exhaust opening 21*b* opens upward, more specifically, in a direction inclined forward and inward (right side) in the vehicle width direction toward the upper side. A CVT intake duct 27 is connected to the CVT intake opening 21*a*. A CVT exhaust duct 28 is connected to the CVT exhaust opening 21*b*, which protrudes toward the engine body 10** side (right side) in the vehicle width direction and exhausts rearward.

The CVT 20 takes in air from the CVT intake opening **21*a* into the inside of the CVT housing 21 through the CVT intake duct 27, and the inside of the CVT housing 21 is cooled by the taken-in air. Next, the air that has cooled the inside of the CVT housing 21 is discharged from the CVT exhaust opening 21*b* to the outside of the CVT housing 21 through the CVT exhaust duct 28. For example, the drive pulley 24 may be provided with a fin so that a centrifugal fan is constituted, and the fin may be configured to take in air from the CVT intake opening 21*a* as the drive pulley 24** rotates.

The CVT intake duct 27 extends forward below between the driver's seat 6A and the passenger seat 6B, and reaches a bonnet space Z located in front of the riding space S, that is, on the front side of the vehicle body floor 135. In the present description, as illustrated in FIG. 1, the bonnet space Z is defined in the front-rear direction as a range that is in front of a toe board 139 and a dashboard 90 that delimits a front end of the riding space S and has the front end extending to a front end portion of the vehicle body 1, and is defined in the vertical direction as a range in which the upper end is a bonnet 91 and the lower end is the vehicle body frame 2 and a wheel house (not shown). The CVT intake duct 27 extends upward in the bonnet space Z and opens upward.

The CVT intake duct 27 includes a first connecting conduit 101 connected in a fluid communicable manner to the CVT intake opening **21*a* and a first conduit 110 connected in a fluid communicable manner to a front end 101*a* of the first connecting conduit 101. The first connecting conduit 101 is coupled to the CVT intake opening 21*a* and a rear end 110*a* (see FIG. 7) of the first conduit 110 via band clamps at both end portions of the first connecting conduit 101**.

The first connecting conduit 101 extends forward from the CVT intake opening **21*a*, and the front end 101*a* reaches a substantially central portion in the front-rear direction of the seat 6. The front end 101*a* opens to the front side inside the tunnel 136. The front end 101*a* is located diagonally above the right side of the propeller shaft 131. The first conduit 110 passes through the tunnel space 138** from the bonnet space Z and extends to the rear side in the vehicle front-rear direction.

Figure 6:
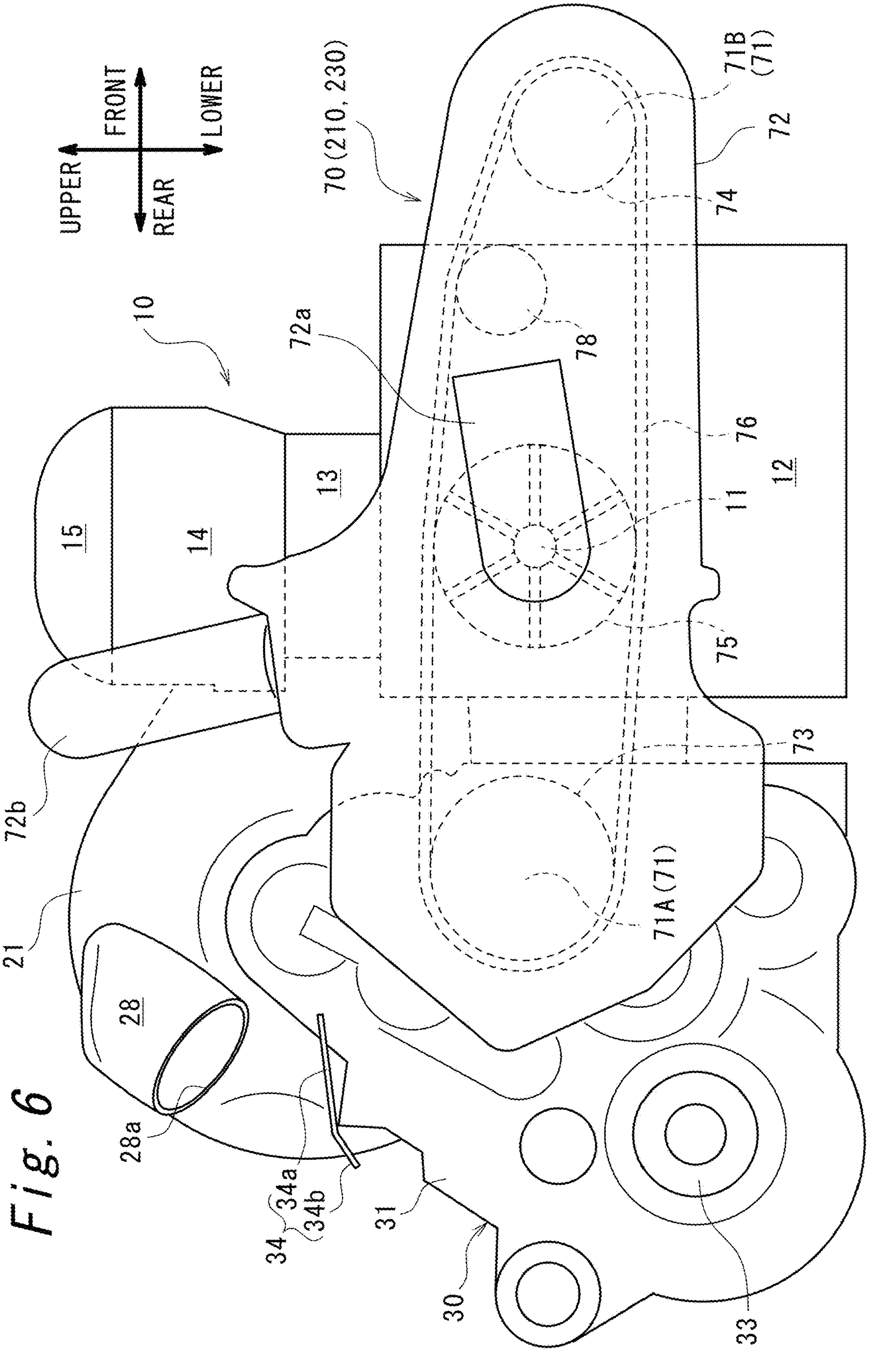
FIG. 6 is a right side view of the area around the engine body.

The CVT exhaust duct 28 projects from the CVT housing 21 in a direction to be closer to the engine body 10 in the vehicle width direction. Specifically, the CVT exhaust duct 28 curves and extends downward toward the inner side in the vehicle width direction, and opens in a direction inclined rearward and inward (right side) in the vehicle width direction toward the downward side above the transmission 30. As shown in FIG. 6, the CVT exhaust duct 28 is located below the upper end portion of the CVT housing 21.

As shown in FIGS. 1 and 2, the transmission 30 is located behind the engine body 10 and adjacent to the right side of the CVT 20. The transmission 30 includes a transmission housing 31 that constitutes an outer shell, and a transmission input shaft 32, a transmission output shaft 33, and a gear train (not shown) accommodated inside the transmission housing 31.

The transmission input shaft 32 extends in the vehicle width direction in an upper front portion of the transmission housing 31, and is connected to the CVT output shaft 23 so as to be able to transmit power. That is, the transmission input shaft 32 is located above and behind the crankshaft 11. The transmission output shaft 33 extends in the vehicle width direction in a lower rear portion of the transmission housing 31. That is, the transmission output shaft 33 is located below and behind the transmission input shaft 32. In the transmission 30, the drive rotation inputted from the CVT output shaft 23 is transmitted to the transmission input shaft 32, has the rotation speed changed through the gear train (not shown), and is outputted from the transmission output shaft 33.

Figure 3:
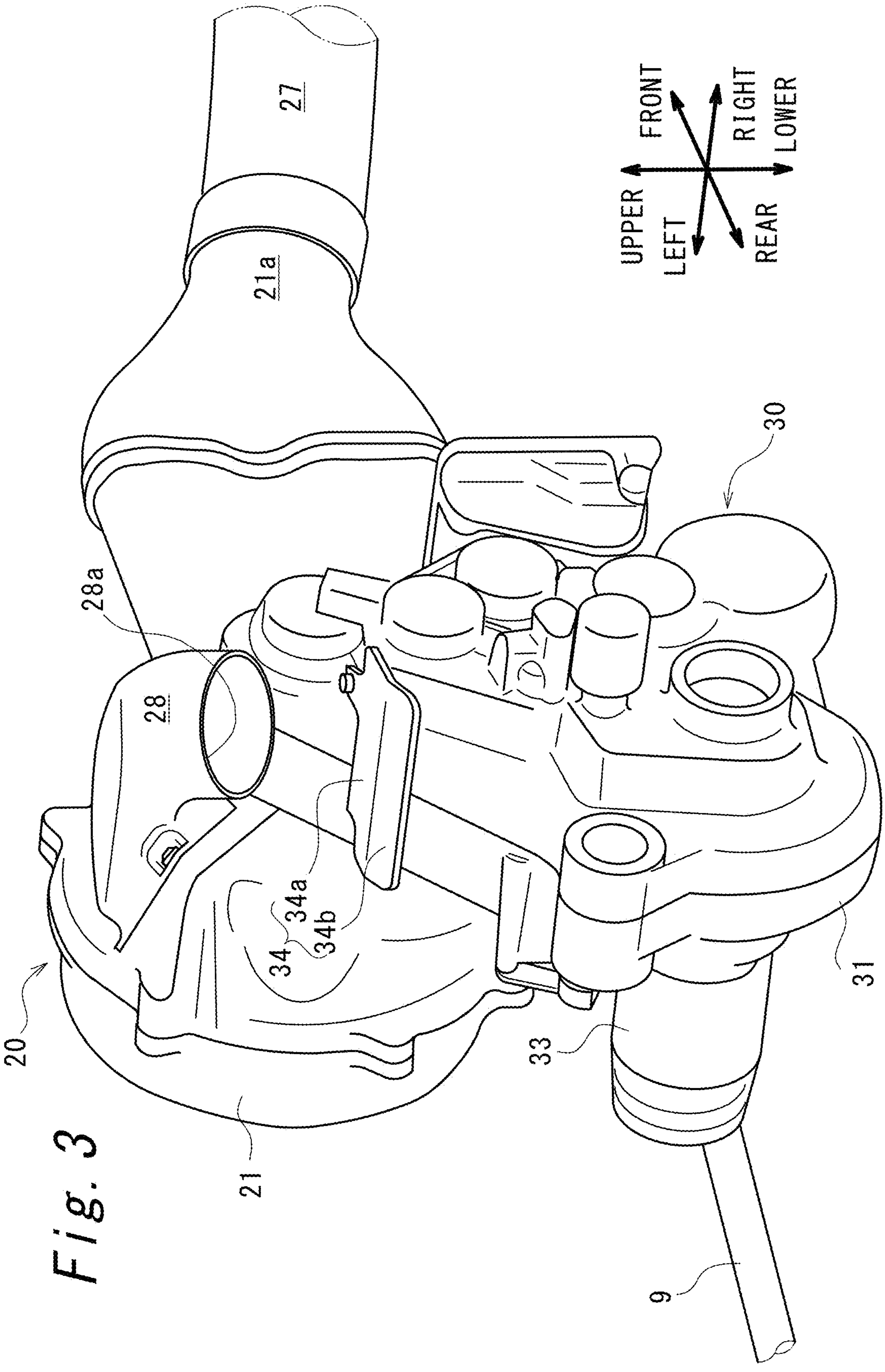
FIG. 3 is a perspective view of an area around a transmission as viewed from the rear.

FIG. 3 is a perspective view of an area around the transmission 30 as viewed from the rear and from the inner side in the vehicle width direction. As shown in FIG. 3, a drive shaft 9 for driving the rear wheel 4 is connected to the transmission output shaft 33. An upper portion of the transmission housing 31 is inclined downward toward the rear.

The transmission 30 further includes a baffle plate (wind guiding plate) 34. The baffle plate 34 is attached to the upper portion of the transmission housing 31. More specifically, the baffle plate 34 is disposed at a position below a discharge port 28*a* of the CVT exhaust duct 28 in the upper portion of the transmission housing 31, and is provided at a position at which the discharge port 28*a* of the CVT exhaust duct 28 faces the baffle plate 34 from above. The baffle plate 34 has a first surface portion 34*a* extending in the horizontal direction and a second surface portion 34*b* extending in a direction inclined downward toward the rear in a manner continuous with a rear edge of the first surface portion 34*a*.

The baffle plate 34 receives the air discharged from the CVT exhaust duct 28 on the first surface portion 34*a* and guides the air rearward via the second surface portion 34*b*. As will be described later, the exhaust system 50 is located behind the baffle plate 34, and the exhaust system 50 is cooled by the air guided by the baffle plate 34.

With reference to FIGS. 1 and 2, the intake system 40 has an intake pipe 41, an air cleaner 42, and an engine intake duct 43. The intake pipe 41 has an intake manifold 44, a throttle body 45, and an air box 46 in this order from the downstream side of the intake path.

The intake manifold 44 has, on the downstream side, two independent port portions 44*a* connected to the intake ports 14*a* of the cylinder head 14 and a collecting port portion 44*b* in which the upstream sides of the independent port portion 44*a* are integrated into one. The independent port portion 44*a* extends in a direction inclined downward toward the rear. The collecting port portion 44*b* extends in the left-right direction in an upstream side end portion (front end in the diagram) of the independent port portions 44*a*. The collecting port portion 44*b* has an entrance in a left end portion.

The throttle body 45 is connected to the left side of the intake manifold 44. Specifically, the throttle body 45 is connected to a left end portion of the collecting port portion 44*b* of the intake manifold 44. In the present embodiment, the throttle body 45 adjusts the amount of air flowing into the engine body 10 as the opening degree of a butterfly valve (not shown) is electronically controlled, and thereby the rotation speed of the engine body 10 (crankshaft 11) is controlled.

The air box 46 is disposed below the front of the throttle body 45 and below a seat back 61 of the driver's seat 6A. The air box 46 is connected to an upstream side end portion (left side in the diagram) of the throttle body 45 with an air pipe 47 interposed between them. The air box 46 acts as a resonator that reduces intake noise in the intake system 40 or a surge tank that suppresses a sudden fluctuation in the amount of air flowing into the engine body 10.

The air cleaner 42 is connected to the air box 46 with an air pipe 48 interposed between them. The air cleaner 42 is disposed below the seat 6 on the front side of the engine body 10 with space between them. Specifically, the air cleaner 42 is disposed below a seat cushion 62 of the driver's seat 6A. More specifically, the air cleaner 42, in top view, has at least the left half overlapping the seat cushion 62 of the driver's seat 6A.

As shown in FIG. 1, in the vertical direction, an upper end portion of the air cleaner 42 is located below an upper end portion of the cylinder head 14. Specifically, the upper end portion of the air cleaner 42 is located at substantially the same height as a straight line W1 that passes through a lower end portion of the cylinder head 14 and extends horizontally in the front-rear direction. Further, as shown in FIG. 2, in the left-right direction, the air cleaner 42 has a left end portion located on the left side of the engine body 10 and further on the right side than a left end portion of the CVT 20, and a right end portion located further on the right side than a left end portion of the engine body.

With reference to FIG. 1 as well, a downstream side end portion of the engine intake duct 43 is connected to the lower rear end of the air cleaner 42. The engine intake duct 43 extends below the driver's seat 6A to the right, curves forward below the substantial center in the vehicle width direction of a pair of the left and right seats 6, and extends forward below the CVT intake duct 27 to reach the bonnet space Z. The front opening tip of the engine intake duct 43 extends upward and opens upward on the right side of the front opening tip of the CVT intake duct 27 in the bonnet space Z. However, the positional relationship between the opening tips is not limited to one in the present embodiment.

The engine intake duct 43 includes a second connecting conduit 102 connected in a fluid communicable manner to the air cleaner 42, and a second conduit 120 connected in a fluid communicable manner to a front end 102*a* of the second connecting conduit 102. The second connecting conduit 102 is coupled to the air cleaner 42 and a rear end 120*a* (see FIG. 7) of the second conduit 120 via band clamps at both end portions of the second connecting conduit 102.

The second connecting conduit 102 extends downward from the air cleaner 42 and extends toward the center side in the vehicle width direction. The front end 102*a* of the second connecting conduit 102 is curved forward and reaches a substantially central portion in the front-rear direction of a pair of the left and right seats 6. The front end 102*a* opens to the front side in the tunnel space 138. The front end 102*a* is located diagonally below the right side of the propeller shaft 131, and is located below the front end 101*a* of the first connecting conduit 101. Specifically, the front end 102*a* is arranged vertically at substantially the same front-rear direction position with respect to the front end 101*a* of the first connecting conduit 101. More specifically, an approximately right half of the front end 102*a* and an approximately left half of the front end 101*a* are arranged vertically. The second conduit 120 passes through the tunnel space 138 from the bonnet space Z and extends to the rear side in the vehicle front-rear direction.

In the intake system 40, the intake air taken in through the engine intake duct 43 is filtered by the air cleaner 42 and then reaches the throttle body 45 via the air box 46. In the throttle body 45, the intake air is adjusted to the air flow rate according to the output required by the engine body 10 and reaches the intake manifold 44. In the intake manifold 44, the intake air is distributed from the collecting port portion 44*b* to the independent port portions 44*a* and introduced into the intake ports 14*a*.

Figure 7:
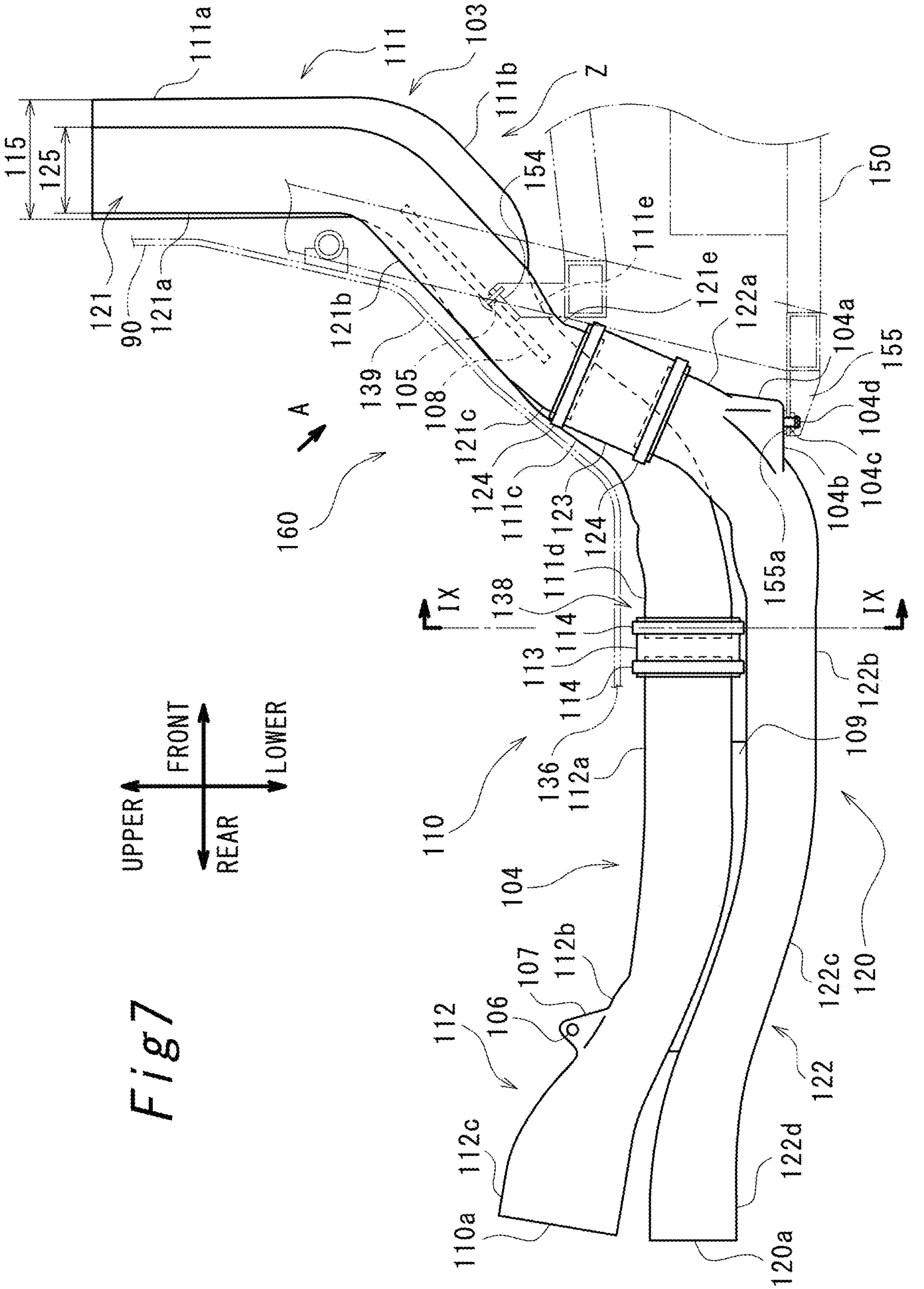
FIG. 7 is a right side view of an intake conduit assembly.
Figure 8:
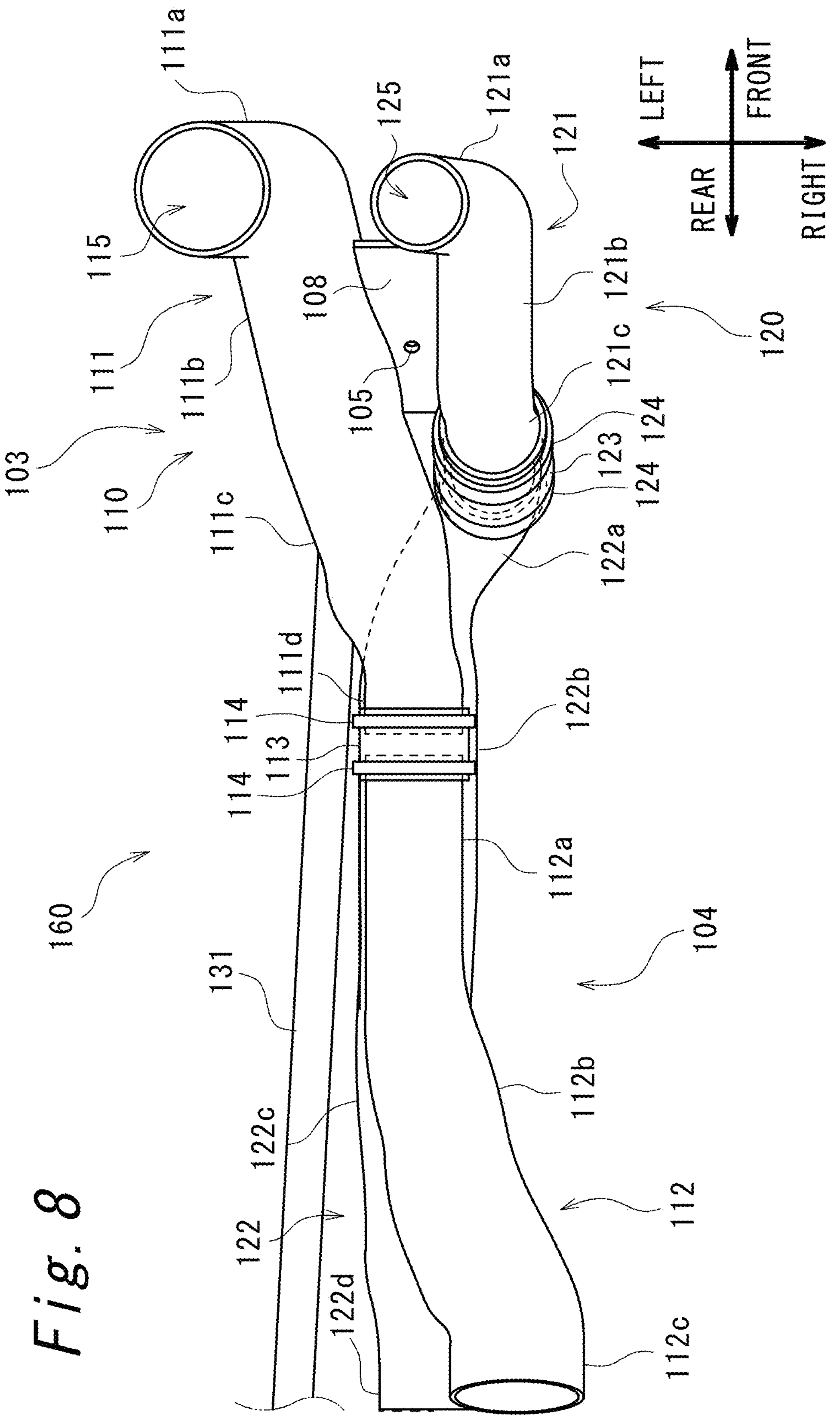
FIG. 8 is a plan view of the intake conduit assembly.

In the present embodiment, the first conduit 110 and the second conduit 120 are combined with each other to constitute an intake conduit assembly 160. Hereinafter, the intake conduit assembly 160 is described in detail with reference to FIGS. 7 to 11. FIG. 7 is a right side view of the intake conduit assembly 160, in which a part of the vehicle body frame 2 is also shown by a chain double-dashed line. FIG. 8 is a plan view of the intake conduit assembly 160.

As illustrated in FIG. 7, the first conduit 110 includes a first conduit front portion 111 located on the front side, a first conduit rear portion 112 located on the rear side with respect to the first conduit front portion 111, and a first connection portion 113 connecting the first conduit front portion 111 and the first conduit rear portion 112 in a fluid communicable manner.

The first conduit front portion 111 extends from the bonnet space Z to the tunnel space 138 in the vertical direction and in the front-rear direction. The first conduit front portion 111 includes a first conduit front first portion 111*a* located at an upstream side end portion of an intake flow path defined in the first conduit front portion 111 and extending in the vertical direction, a first conduit front second portion 111*b* extending in a direction inclined downward toward the rear side from a lower end portion of the first conduit front first portion 111*a*, a first conduit front third portion 111*c* further inclined downward toward the rear side from a rear end of the first conduit front second portion 111*b*, and a first conduit front fourth portion 111*d* extending substantially horizontally toward the rear side from a rear end of the first conduit front third portion 111*c*.

The first conduit front first portion 111*a*, the first conduit front second portion 111*b*, and the first conduit front third portion 111*c* are located in the bonnet space Z. The first conduit front fourth portion 111*d* is located in the tunnel space 138. The first conduit front second portion 111*b* and the first conduit front third portion 111*c* extend along the toe board 139. A first conduit front portion curved portion 111*e* curved so as to protrude upward is formed at a connection portion between the first conduit front second portion 111*b* and the first conduit front third portion 111*c*.

As illustrated in FIG. 8, in the first conduit front portion 111, an intake port 115 at an upstream side end portion is located at a substantially center position in the vehicle width direction of the vehicle body 1, more specifically, a center position of the intake port 115 is located slightly closer to the left side than a center position of the vehicle body 1. In the first conduit front portion 111, in a plan view illustrated in FIG. 8, the first conduit front first portion 111*a*, the first conduit front second portion 111*b*, and the first conduit front third portion 111*c* extend in a direction inclined rightward toward the rear side, and the first conduit front fourth portion 111*d* extends substantially parallel to the front-rear direction at a position adjacent to the right side of the propeller shaft 131 (see FIG. 2).

As illustrated in FIG. 7, the first conduit rear portion 112 extends in the front-rear direction in the tunnel space 138. The first conduit rear portion 112 includes a first conduit rear first portion 112*a* located at an upstream side end portion of an intake flow path defined in the first conduit rear portion 112 and extending substantially horizontally toward the rear side, a first conduit rear second portion 112*b* extending in a direction inclined upward toward the rear side from a rear end of the first conduit rear first portion 112*a*, and a first conduit rear third portion 112*c* extending substantially horizontally toward the rear side from a rear end of the first conduit rear second portion 112*b*.

The first conduit rear first portion 112*a* is located at a position corresponding to a foot space on the front side of the seat 6 in a front-rear direction. The first conduit rear second portion 112*b* and the first conduit rear third portion 112*c* are located at positions corresponding to the lower side of the seat 6 in the front-rear direction.

As illustrated in FIG. 8, the first conduit rear portion 112 extends in the front-rear direction on the right side of the propeller shaft 131. Specifically, in a plan view illustrated in FIG. 8, the first conduit rear first portion 112*a* extends substantially parallel to the front-rear direction, the first conduit rear second portion 112*b* extends rearward in a direction inclined rightward, and the first conduit rear third portion 112*c* extends substantially parallel to the front-rear direction.

The first connection portion 113 is a flexible pipe with bellows, and a rear end of the first conduit front portion 111 and a front end of the first conduit rear portion 112 are inserted into inner peripheral portions of both ends of the first connection portion 113. The first connection portion 113 is fixed to the first conduit front portion 111 and the first conduit rear portion 112 by a clamp 114 at each of both end portions. In the present embodiment, the first connection portion 113 is a rubber hose member in which bellows are integrally molded, but any pipe may be employed as long as the pipe has flexibility and airtightness that allows an intake passage to be constituted.

The first connection portion 113 is located in the tunnel space 138. The first connection portion 113 extends substantially parallel to the front-rear direction along an axial direction of the first conduit front fourth portion 111*d* and the first conduit rear first portion 112*a*.

Figure 9:
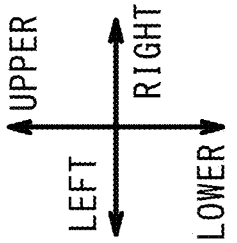
FIG. 9 is a cross-sectional view taken along line IX-IX of FIG. 7.
Figure 9:
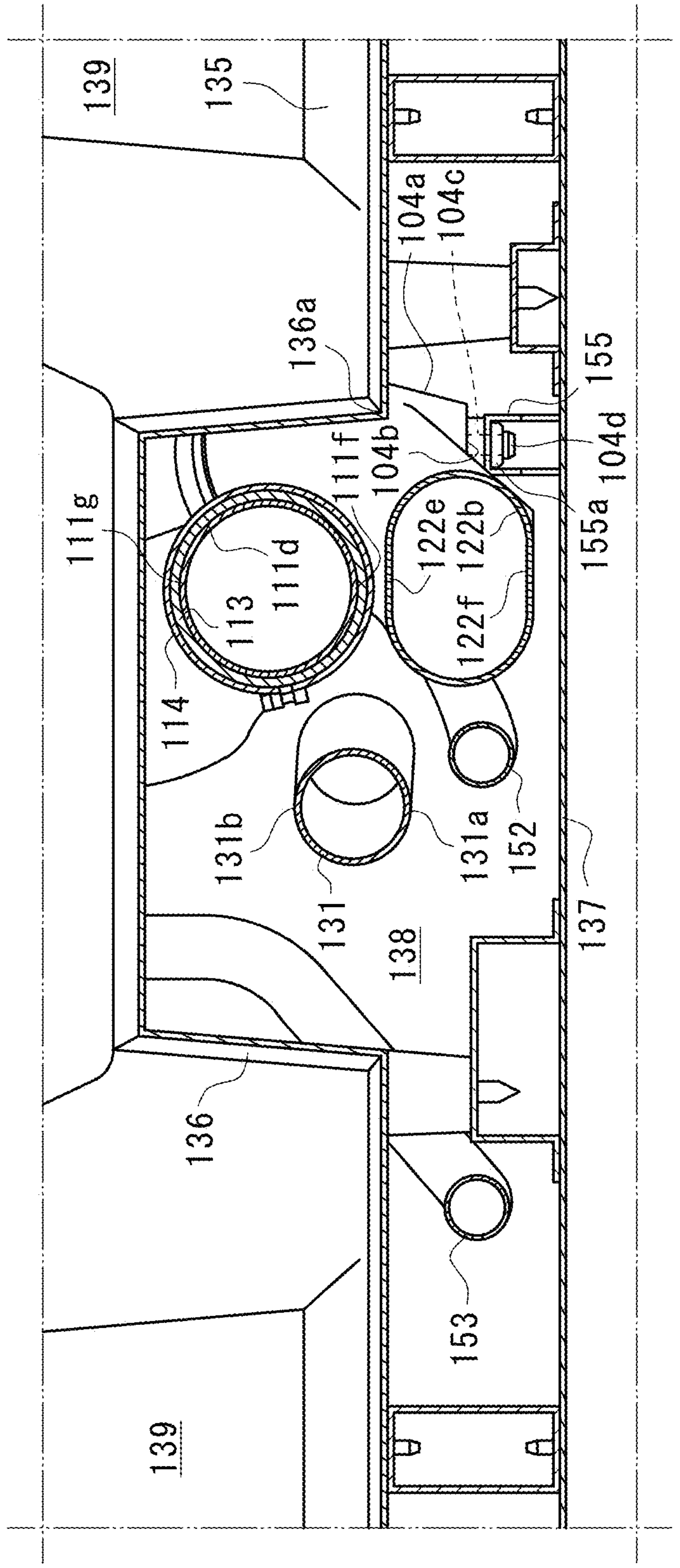

FIG. 9 is a cross section taken along line IX-IX in FIG. 7 and parallel to the left-right direction and the vertical direction at a position where the first conduit front fourth portion 111*d* and the first connection portion 113 are fixed by the clamp 114. As illustrated in FIG. 9, the first conduit front fourth portion 111*d* is located in the tunnel space 138. The first conduit front fourth portion 111*d* has a circular shape with a constant radius.

The first conduit front fourth portion 111*d* is adjacent to the right side of the propeller shaft 131. More specifically, the first conduit front fourth portion 111*d* has an outer diameter larger than that of the propeller shaft 131, a lower end 111*f* located above a lower end 131*a* of the propeller shaft 131 and below an upper end 131*b* of the propeller shaft 131, and an upper end 111*g* located above the upper end 131*b* of the propeller shaft 131. The first conduit front fourth portion 111*d* is entirely located inside the tunnel 136.

As illustrated in FIG. 7, the second conduit 120 includes a second conduit front portion 121 located with respect to the front side, a second conduit rear portion 122 located on the rear side with respect to the second conduit front portion 121, and a second connection portion 123 connecting the second conduit front portion 121 and the second conduit rear portion 122 in a fluid communicable manner.

The second conduit front portion 121 extends from the bonnet space Z to the tunnel space 138 in the vertical direction and in the front-rear direction. The second conduit front portion 121 includes a second conduit front first portion 121*a* located at an upstream side end portion of an intake flow path defined in the second conduit front portion 121 and extending in the vertical direction, a second conduit front second portion 121*b* extending in a direction inclined downward toward the rear side from a lower end portion of the second conduit front first portion 121*a*, and a second conduit front third portion 121*c* extending in a direction further inclined downward toward the rear side from a rear end of the second conduit front second portion 121*b*.

The second conduit front first portion 121*a*, the second conduit front second portion 121*b*, and the second conduit front third portion 121*c* are located in the bonnet space Z. The second conduit front second portion 121*b* and the second conduit front third portion 121*c* extend along the toe board 139. A second conduit front portion curved portion 121*e* curved so as to protrude upward is formed at a connection portion between the second conduit front second portion 121*b* and the second conduit front third portion 121*c*.

As illustrated in FIG. 8, the second conduit front portion 121 is adjacent to the right side with respect to the first conduit front portion 111. An intake port 125 at an upstream side end portion of the second conduit front portion 121 is located further on the right side than a center position in the vehicle width direction of the vehicle body 1, and more specifically, is adjacent to the right side with respect to the intake port 115 of the first conduit front portion 111. In the second conduit front portion 121, in the plan view illustrated in FIG. 8, the second conduit front first portion 121*a* extend in a direction inclined rightward toward the rear side, and the second conduit front second portion 121*b* and the second conduit front third portion 121*c* extends substantially parallel to the front-rear direction. The second conduit front first portion 121*a* is adjacent to the right side with respect to the first conduit front first portion 111*a*. The second conduit front second portion 121*b* and the second conduit front third portion 121*c* are adjacent to the right side with respect to the first conduit front second portion 111*b* and the upstream half of the first conduit front third portion 111*c*.

As illustrated in FIG. 7, the second conduit rear portion 122 extends in the front-rear direction from the bonnet space Z to the tunnel space 138. The second conduit rear portion 122 includes a second conduit rear first portion 122*a* located at an upstream side end portion of an intake flow path defined in the second conduit rear portion 122 and extending in a direction inclined downward toward the rear side, a second conduit rear second portion 122*b* extending substantially in parallel toward the rear side from a rear end of the second conduit rear first portion 122*a*, a second conduit rear third portion 122*c* extending in a direction inclined upward toward the rear side from a rear end of the second conduit rear second portion 122*b*, and a second conduit rear fourth portion 122*d* extending substantially horizontally toward the rear side from a rear end of the second conduit rear third portion 122*c*.

The second conduit rear first portion 122*a* is located in the bonnet space Z. The second conduit rear second portion 122*b* is located at a position corresponding to a foot space on the front side of the seat 6 in the front-rear direction. The second conduit rear third portion 122*c* and the second conduit rear fourth portion 122*d* are located at positions corresponding to the lower side of the seat 6 in the front-rear direction.

As illustrated in FIG. 8, the second conduit rear portion 122 extends in the front-rear direction on the right side of the propeller shaft 131. Specifically, in the plan view illustrated in FIG. 8, the second conduit rear first portion 122*a* extends toward the rear side in a direction inclined leftward, and has a rear end located immediately below the first conduit front fourth portion 111*d*. The second conduit rear second portion 122*b*, the second conduit rear third portion 122*c*, and the second conduit rear fourth portion 122*d* extend substantially parallel to the front-rear direction. The second conduit rear second portion 122*b* is located immediately below the first conduit rear first portion 112*a*.

The second connection portion 123 is a flexible pipe with bellows, and a rear end of the second conduit front portion 121 and a front end of the second conduit rear portion 122 are inserted into inner peripheral portions of both ends of the second connection portion 123. The second connection portion 123 is fixed to the second conduit front portion 121 and the second conduit rear portion 122 by a clamp 124 at each of both end portions. In the present embodiment, the second connection portion 123 is a rubber hose member in which bellows are integrally molded, but any pipe may be employed as long as the pipe has flexibility and airtightness that allows an intake passage to be constituted.

The second connection portion 123 is located in the bonnet space Z. That is, the second connection portion 123 is located further on the front side than the first connection portion 113, and is different in position in the front-rear direction from the first connection portion 113. The second connection portion 123 extends in a direction inclined downward toward the rear side along an axial direction of the second conduit front third portion 121*c* and the second conduit rear first portion 122*a*.

As illustrated in FIG. 9, the second conduit rear second portion 122*b* is located in the tunnel space 138. The second conduit rear second portion 122*b* has a cross-sectional shape longer in the left-right direction than in the vertical direction at least at a cross-sectional position illustrated in FIG. 9, that is, a position facing the clamp 114 from below. Specifically, at the cross-sectional position, the second conduit rear second portion 122*b* is long in the left-right direction and shorter in the vertical direction as compared with the first conduit front fourth portion 111*d* located above.

The second conduit rear second portion 122*b* is adjacent to the right side with respect to the propeller shaft 131. More specifically, the second conduit rear second portion 122*b* has an outer diameter larger than that of the propeller shaft 131, an upper end 122*e* located above the lower end 131*a* of the propeller shaft 131 and below the upper end 131*b* of the propeller shaft 131, and an upper end 122*e* located below the upper end 131*b* of the propeller shaft 131. The second conduit rear second portion 122*b* has the upper end 122*e* located at substantially the same height as a lower end 136*a* of the tunnel 136, and is located below the tunnel 136 as a whole. The second conduit rear second portion 122*b* is adjacent to the right side with respect to the first water pipe 152.

As illustrated in FIG. 7, in the present embodiment, the first conduit front portion 111 and the second conduit front portion 121 constitute a conduit front portion 103 integrally formed by resin molding, and the first conduit rear portion 112 and the second conduit rear portion 122 constitute a conduit rear portion 104 integrally formed by resin molding.

Figure 10:
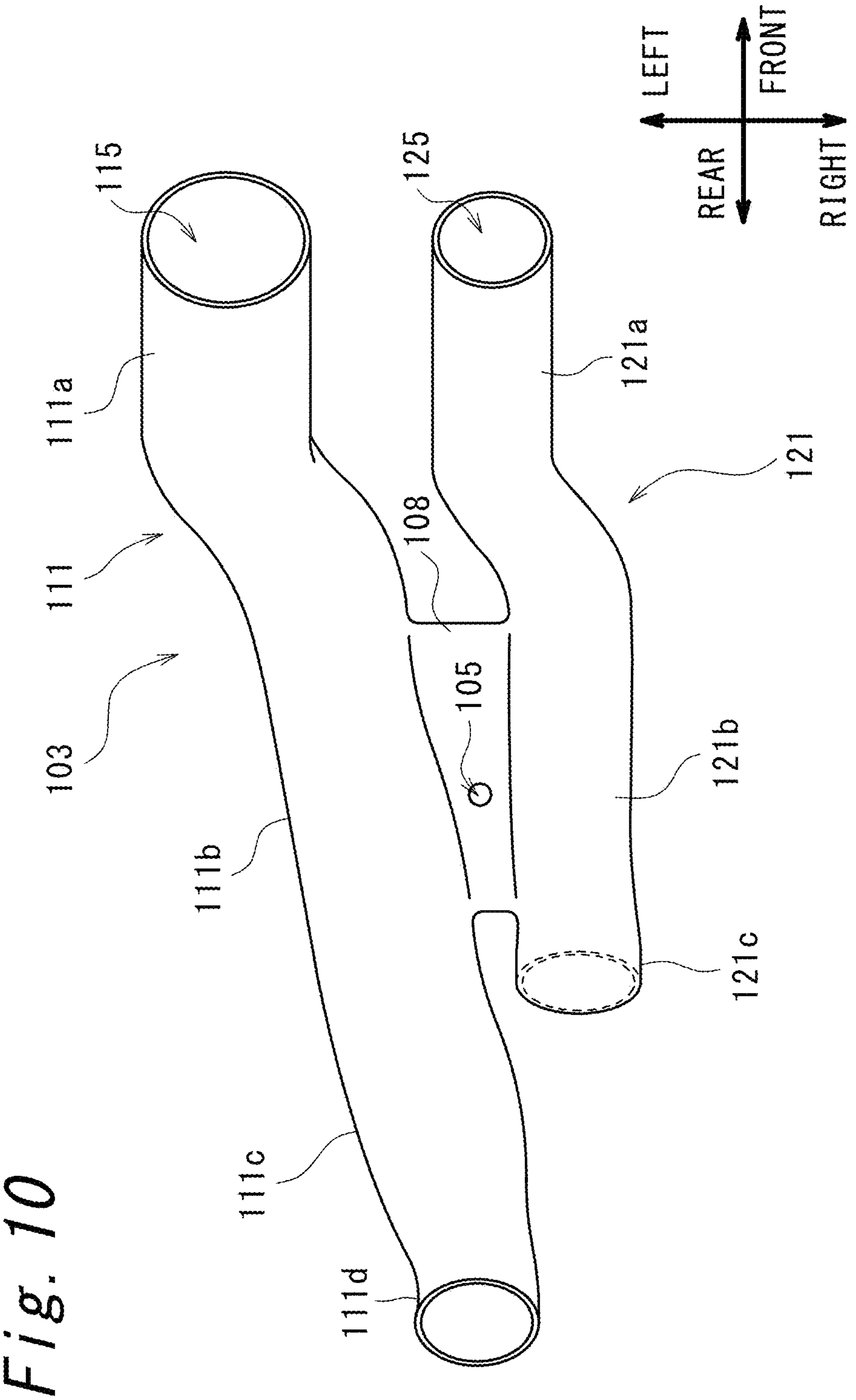
FIG. 10 is a perspective view of a conduit front portion taken along arrow A in FIG. 7.

FIG. 10 is a view of arrow A in FIG. 7, that is, a perspective view of the conduit front portion 103 as viewed in a direction orthogonal to an axis of the first conduit front second portion 111*b* and the second conduit front second portion 121*b*. As illustrated in FIG. 10, in the conduit front portion 103, the first conduit front portion 111 and the second conduit front portion 121 are arranged in the left-right direction and do not overlap each other in the vertical direction.

Referring also to FIG. 7, in the conduit front portion 103, the first conduit front second portion 111*b* and the second conduit front second portion 121*b* are arranged side by side on the left and right, and extend substantially in parallel in a direction inclined downward toward the rear side. The conduit front portion 103 has a plate-like left-right coupling portion 108 that connects the first conduit front second portion 111*b* and the second conduit front second portion 121*b* in the left-right direction. The left-right coupling portion 108 extends in the left-right direction between the first conduit front second portion 111*b* and the second conduit front second portion 121*b* and extends in a direction inclined downward toward the rear side along a central axis of both the first conduit front second portion 111*b* and the second conduit front second portion 121*b*. The left-right coupling portion 108 is formed with a first hole 105 penetrating in a thickness direction thereof. The first hole 105 penetrates the left-right coupling portion 108 in a direction inclined downward toward the front side.

The conduit front portion 103 can be formed, for example, by blow molding using a mold in which a mold dividing direction is set in a direction orthogonal to the left-right coupling portion 108.

As illustrated in FIG. 7, in the conduit rear portion 104, the first conduit rear portion 112 and the second conduit rear portion 122 are arranged in the vertical direction and do not overlap each other in the left-right direction.

Referring also to FIG. 8, in the conduit rear portion 104, the first conduit rear first portion 112*a* and the second conduit rear second portion 122*b* are arranged vertically and extend substantially parallel in the front-rear direction, and the first conduit rear second portion 112*b* and the second conduit rear third portion 122*c* are arranged vertically and extend substantially parallel in a direction inclined upward toward the rear side.

The conduit rear portion 104 has a plate-like vertical coupling portion 109 that connects the first conduit rear first portion 112*a* and the first conduit rear second portion 112*b*, and the second conduit rear second portion 122*b* and the second conduit rear third portion 122*c* in the vertical direction. The vertical coupling portion 109 extends between the first conduit rear first portion 112*a* and the first conduit rear second portion 112*b*, and the second conduit rear second portion 122*b* and the second conduit rear third portion 122*c* in the vertical direction along a central axis of both thereof. The first conduit rear second portion 112*b* has a protruding portion 107 protruding upward and having a thickness in the left-right direction. The protruding portion 117 is formed with a second hole 106 penetrating in the left-right direction thereof.

The second conduit rear first portion 122*a* of the conduit rear portion 104 is formed with a protruding portion 104*a* protruding downward. The protruding portion 104*a* has a flat seat portion 104*b* extending in the horizontal direction at a lower end. The protruding portion 104*a* further includes a pin portion 104*c* extending downward from the seat portion 104*b*. The pin portion 104*c* has an enlarged diameter portion 104*d* having a large outer diameter as a remaining portion at the tip.

Figure 11:
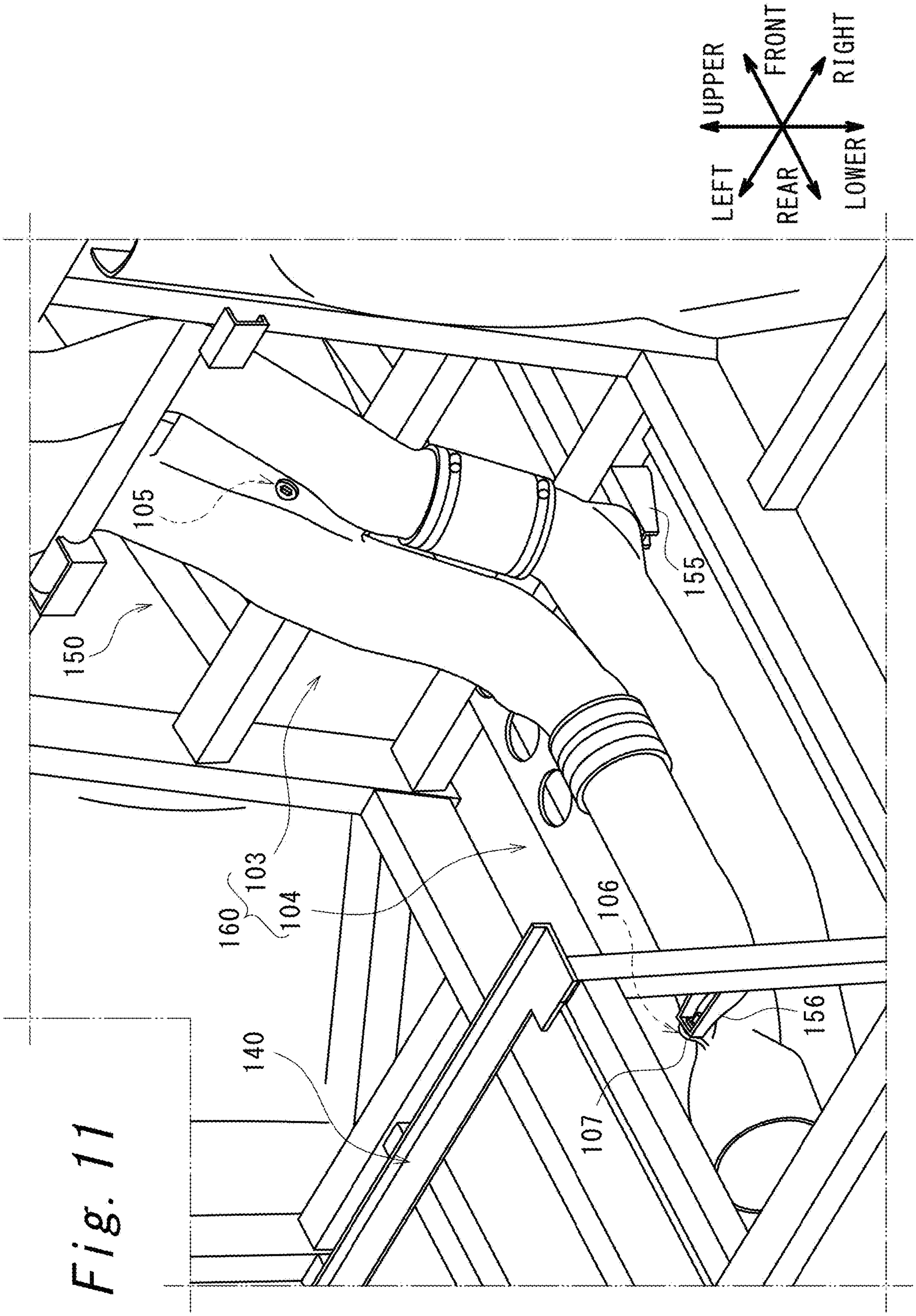
FIG. 11 is a perspective view of the intake conduit assembly.

FIG. 11 is a perspective view illustrating attachment of the intake conduit assembly 160 to the vehicle body frame 2. As illustrated in FIG. 11, in the intake conduit assembly 160, the conduit front portion 103 is disposed in a narrow gap between the toe board 139 (see FIG. 7) and the front frame 150.

As illustrated in FIG. 7, a fastening member is fastened to a first fixing portion 154 provided in the front frame 150 via the first hole 105, and thereby the conduit front portion 103 is fixed to the front frame 150. Here, since the first conduit front portion curved portion 111*e* and the second conduit front portion curved portion 121*e* curved so as to protrude upward are formed in the conduit front portion 103, the first conduit front portion curved portion 111*e* and the second conduit front portion curved portion 121*e* can be avoided from interfering with the front frame 150.

As illustrated in FIG. 11, the conduit rear portion 104 has a front portion fixed to the front frame 150 and a rear portion fixed to the seat frame 140.

As illustrated in FIG. 7, specifically, the pin portion 104*c* of the protruding portion 104*a* is passing through from above a grommet 155*a* provided in a support portion 155 extending to the rear side from a lower rear end of the front frame 150 at a front portion and the seat portion 104*b* is brought into contact with the grommet 155*a*, and thereby the conduit rear portion 104 is fixed to the front frame 150.

As illustrated in FIG. 11, at a rear portion, a fastening member is fastened to a third fixing portion 156 extending in the left-right direction from the seat frame 140 via the second hole 106, and thereby the conduit rear portion 104 is fixed to the seat frame 140.

Figure 4:
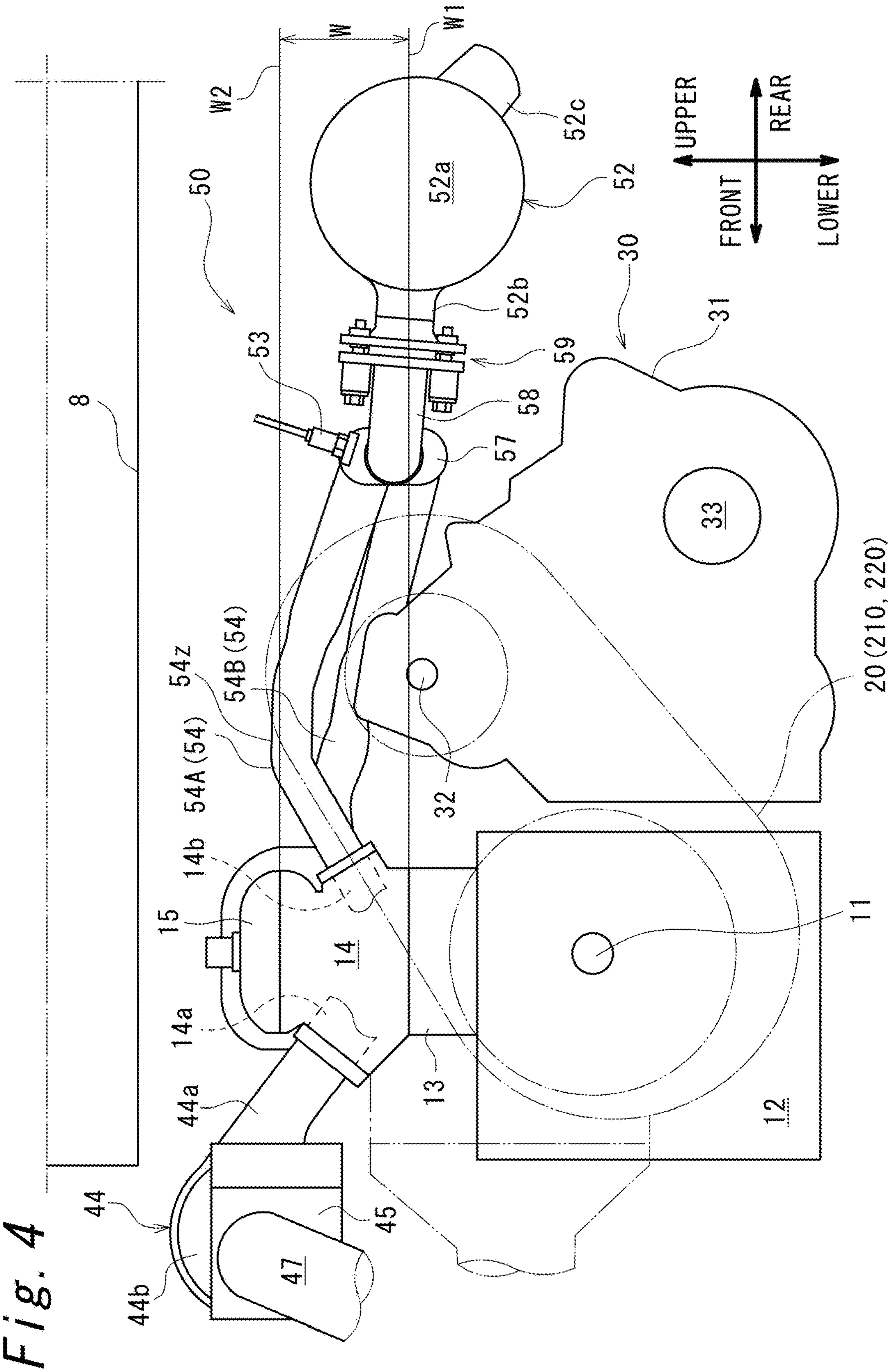
FIG. 4 is an enlarged view of the area around an engine body in FIG. 1.
Figure 5:
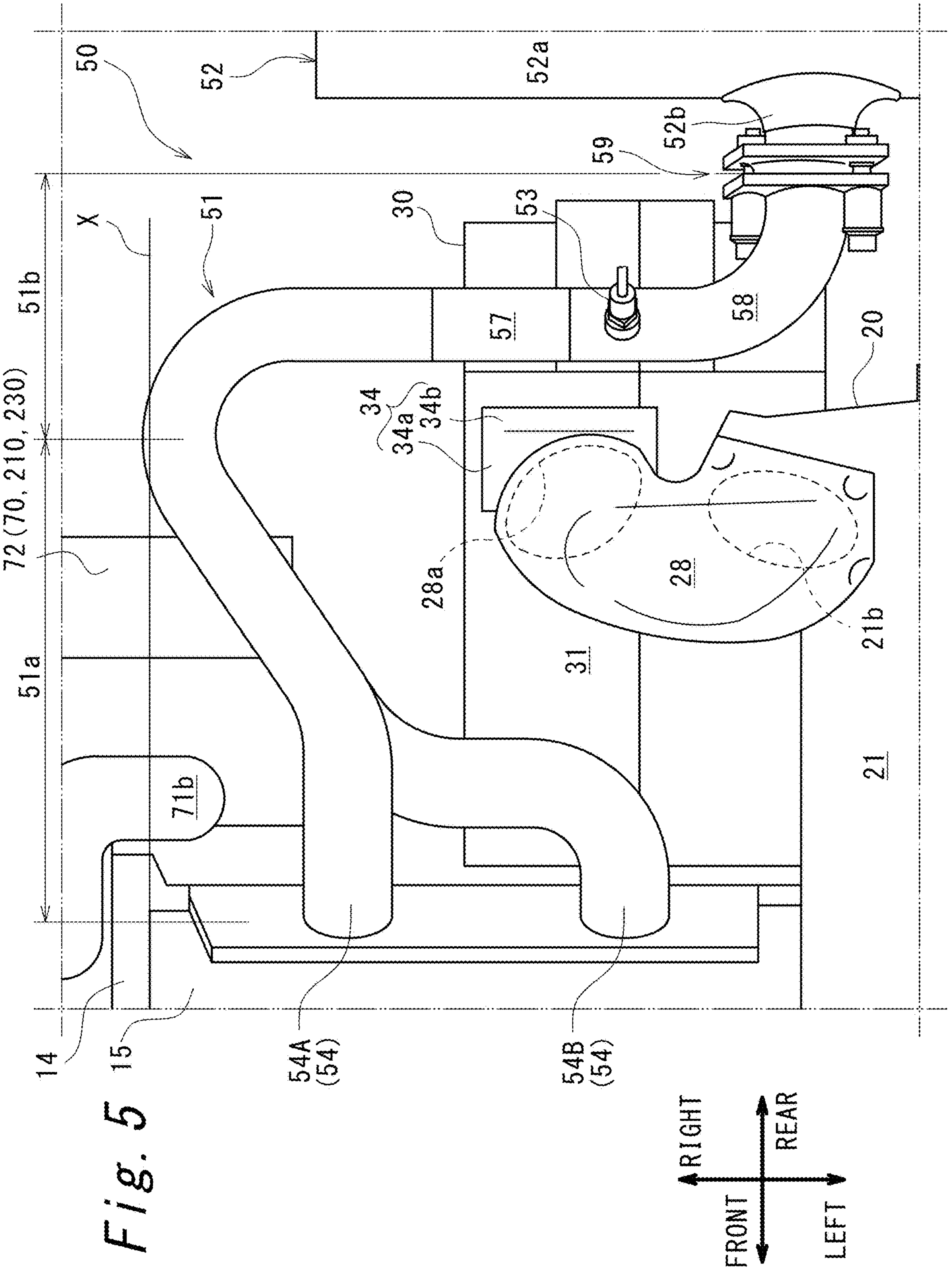
FIG. 5 is an enlarged view of the area around an exhaust pipe in FIG. 2.

FIG. 4 is a right side view illustrating an area around the exhaust system 50 in the powertrain mechanism 7. Note that, in FIG. 4, the CVT 20 is shown by a chain double-dashed line. FIG. 5 is a top view illustrating an area around an exhaust pipe 51 in an enlarged manner in the powertrain mechanism 7. As shown in FIGS. 4 and 5, the exhaust system 50 includes the exhaust pipe 51, an exhaust muffler 52, and an exhaust gas sensor 53. The exhaust pipe 51 includes, in order from the upstream side, two independent exhaust pipes 54, one collecting pipe 57, and one exhaust pipe 58.

Two of the independent exhaust pipes 54 are connected to two of the exhaust ports 14*b* of the cylinder head 14. Two of the independent exhaust pipes 54 are composed of a first independent exhaust pipe 54A and a second independent exhaust pipe 54B arranged in order from the right side. The second independent exhaust pipe 54B is connected to the exhaust port 14*b* (CVT side exhaust port) located on the side closest to a CVT between two of the exhaust ports 14*b*, and constitutes a CVT side exhaust pipe of the present disclosure.

The first independent exhaust pipe 54A extends in a direction inclined upward toward the rear side, and has a top portion 54*z* in a substantially central portion in the front-rear direction.

The first independent exhaust pipe 54A extends toward the rear side from the exhaust port 14*b*, curves to the left, and then curves to the right. The second independent exhaust pipe 54B curves to the right toward the rear side from the exhaust port 14*b*. Specifically, the second independent exhaust pipe 54B curves approximately at right angles to the opposite side to a CVT, that is, to the right, immediately after extending to the rear side from an end portion connected to the exhaust port 14*b*.

The second independent exhaust pipe 54B is adjacent to the right side of an upper end portion of the transmission 30.

Each of the first independent exhaust pipe 54A and the second independent exhaust pipe 54B extends to the rear side in a direction inclined rightward, then curves leftward, extends leftward substantially in parallel with the vehicle width direction, and is connected to an upstream side end portion of the collecting pipe 57.

The collecting pipe 57 is located in a direction in which a discharge port of the CVT exhaust duct 28 is directed in the top view illustrated in FIG. 5. As a result, air discharged from the CVT exhaust duct 28 is guided by the baffle plate 34 and supplied to the collecting pipe 57. Therefore, although temperature of the collecting pipe 57 tends to rise due to gathering of the first independent exhaust pipe 54A and the second independent exhaust pipe 54B, the temperature rise is effectively reduced by air discharged from the CVT 20. In this manner, heat transfer of temperature from the exhaust system 50 to the cargo bed 8 is suppressed.

The exhaust pipe 58 is connected to a downstream side end portion of the collecting pipe 57. The exhaust pipe 58 extends to the left side substantially parallel to the vehicle width direction from a downstream side end portion of the collecting pipe 57, then curves rearward behind a left end portion of the engine body 10, and is connected to an upstream side end portion (a muffler inlet portion 52*b*) of the exhaust muffler 52 with a spherical joint 59 interposed between them. The exhaust gas sensor 53 is attached to an upstream side portion of the exhaust pipe 58.

As described above, the exhaust pipe 51 curves to the right toward the rear, then extends to the rear of a right end portion of the engine body 10, curves to the left, and extends to the rear of a left end portion of the engine body 10. As a whole, the exhaust pipe 51 extends in a substantially S-shape. Of the exhaust pipe 51, a portion located on the upstream side and extending to the right toward the rear side constitutes an upstream side exhaust pipe 51*a* (also referred to as the front half portion) of the present disclosure, and a portion connected to a rear end portion of the upstream side exhaust pipe 51*a* and extending to the left side toward the rear side constitutes a downstream side exhaust pipe 51*b* (also referred to as the rear half portion) of the present disclosure.

That is, in the present embodiment, the upstream side exhaust pipe 51*a* includes a portion that extends in a direction inclined to the right side toward the rear side and is located on the far right in two of the independent exhaust pipes 54. Further, the downstream side exhaust pipe 51*b* includes a portion extending substantially parallel to the vehicle width direction by curving to the left toward the rear side in a manner continuous with a downstream side end portion of the upstream side exhaust pipe 51*a* of two of the independent exhaust pipes 54, the collecting pipe 57, and the exhaust pipe 58.

The upstream side exhaust pipe 51*a* has, in the top view, a portion that passes through a region that is further on the right side than a straight line X (see FIG. 5) extending in the front-rear direction through a right end portion of the cylinder head cover 15, and is located further on the left side than a right end portion of an auxiliary case 72 (the engine auxiliary unit 70, the power transmission unit 210, and the auxiliary transmission unit 230) described later.

The exhaust muffler 52 has a cylindrical muffler main body 52*a* extending in the vehicle width direction, the muffler inlet portion 52*b* protruding forward at a left end portion, and a tail pipe 52*c* protruding rightward from a right end portion and curves rearward. The muffler inlet portion 52*b* constitutes a connection portion connected to a downstream side end portion of the exhaust pipe 51. In other words, in the exhaust system 50, the exhaust pipe 51 and the exhaust muffler 52 are disposed so as to be side by side in the front-rear direction, do not overlap in the vertical direction, and are different in position in the front-rear direction.

Here, referring to FIG. 4, the exhaust system 50 is disposed at substantially the same height as the cylinder head 14 in the vertical direction. Specifically, the exhaust pipe 51 is generally located in a region W where the cylinder head 14 is projected rearward. The region W is defined as a region in the vertical direction between the straight line W1 that passes through a lower end portion of the cylinder head 14 and extends to the rear and a straight line W2 that passes through an upper end portion of the cylinder head 14 and extends to the rear. In the vertical direction, the top portion 54*z* that is highest of the exhaust pipe 51 is located at substantially the same height as the straight line W1. Further, an upper end portion of the exhaust muffler 52 is located at substantially the same height as the straight line W1 in the vertical direction.

As illustrated in FIG. 2, in the left-right direction, the engine auxiliary unit 70 (the power transmission unit 210 and the auxiliary transmission unit 230) is disposed adjacent to the side opposite to the CVT 20 of the engine body 10, that is, on the right side. FIG. 6 is a right side view illustrating an area around the engine body 10. As shown in FIG. 6, the engine auxiliary unit 70 has an engine auxiliary 71 and an auxiliary case 72 that accommodates the engine auxiliary 71. The auxiliary case 72 covers the engine auxiliary 71 accommodated inside from the outer side in the vehicle width direction, which prevents a foreign matter such as water or sand from directly splashing on the engine auxiliary 71.

The engine auxiliary 71 includes an alternator 71A disposed behind the engine body 10 and an air conditioner compressor 71B disposed in front of the engine body 10. The alternator 71A and the air conditioner compressor 71B have driven pulleys 73 and 74 in a right end portion. Further, inside the auxiliary case 72, a drive pulley 75 fixed to a right end portion of the crankshaft 11, a belt 76 wound over between the drive pulley 75 and the driven pulleys 73 and 74, and a tensioner 78 that adjusts the tension of the belt 76 are disposed.

Therefore, the alternator 71A and the air conditioner compressor 71B are rotationally driven as the crankshaft 11 rotates.

The auxiliary case 72 has an auxiliary case intake pipe 72*a* and an auxiliary case exhaust pipe 72*b*. The auxiliary case intake pipe 72*a* extends forward from a position facing a right end portion of the crankshaft 11 and opens forward. For example, the drive pulley 75 may be provided with a fin to constitute a centrifugal fan, and, as the drive pulley 75 rotates, air may be taken in from the auxiliary case intake pipe 72*a* to the inside of the auxiliary case 72.

The auxiliary case exhaust pipe 72*b* extends from an upper portion of the auxiliary case 72 in a direction inclined rearward and opens to the rear of the engine body 10. Specifically, the auxiliary case exhaust pipe 72*b* opens from the right side toward the independent exhaust pipe 54 of the exhaust system 50. The independent exhaust pipe 54 is effectively cooled by the air discharged from the auxiliary case exhaust pipe 72*b*. This also suppresses the heat transfer of temperature from the exhaust system 50 to the cargo bed 8.

Here, in the powertrain mechanism 7 according to the present embodiment, at least a part of each of the transmission 30, the air cleaner 42, the exhaust pipe 51, or the exhaust muffler 52 is disposed within a region Y (see FIGS. 1 and 2) in which the engine body 10 is projected in the front-rear direction.

As shown in FIG. 1, the region Y has an upper end portion constituted by a horizontal plane Y1 passing through an upper end portion of the cylinder head cover 15, and has a lower end portion constituted by a horizontal plane Y2 passing through a lower end portion of the crankcase 12. Further, as shown in FIG. 2, the region Y has a left end portion constituted by an extending surface Y3 that passes through a left end portion of the engine body 10 and extends in the front-rear direction, and a right end portion constituted by a vertical plane Y4 that passes through a right end portion of the engine body 10 and extends in the front-rear direction. Note that, in a case where an additional part such as an oil pan is mounted on a lower end portion of the crankcase 12, the horizontal plane Y2 is defined by a horizontal plane passing through a lower end portion of the additional part.

According to the vehicle 100 according to the embodiment described above, an effect described below is achieved.

(1) The vehicle 100 includes:

the vehicle body floor 135;

the bonnet space Z located on the front side in the vehicle front-rear direction with respect to the vehicle body floor 135;

the first conduit 110 extending from the bonnet space Z toward the rear side in the vehicle front-rear direction below the vehicle body floor 135, the first conduit 110 including the first conduit front portion 111 located on the front side and the first conduit rear portion 112 located on the rear side with respect to the first conduit front portion 111; and the second conduit 120 extending from the bonnet space Z toward the rear side in the vehicle front-rear direction below the vehicle body floor 135, the second conduit 120 including the second conduit front portion 121 located on the front side and the second conduit rear portion 122 located on the rear side with respect to the second conduit front portion 121, in which the first conduit rear portion 112 and the second conduit rear portion 122 are arranged in a vehicle vertical direction below the vehicle body floor 135.

As a result, since a space required for disposing the first conduit rear portion 112 and the second conduit rear portion 122 can be made compact in the vehicle left-right direction, the first conduit rear portion 112 and the second conduit rear portion 122 can be easily disposed below the vehicle body floor 135.

(2) In the bonnet space Z, the first conduit front portion 111 and the second conduit front portion 121 extend in a direction inclined downward toward the rear side, and are arranged in the vehicle left-right direction.

As a result, since a space in which the first conduit front portion 111 and the second conduit front portion 121 are disposed can be made compact in the vehicle front-rear direction, the first conduit front portion 111 and the second conduit front portion 121 can be easily disposed in the bonnet space Z.

(3) The first conduit rear portion 112 and the second conduit rear portion 122 constitute the conduit rear portion 104 molded as an integral component, and in the conduit rear portion 104, the first conduit rear portion 112 and the second conduit rear portion 122 do not overlap each other in the vehicle left-right direction.

As a result, the conduit rear portion 104 can be integrally molded by a mold whose mold dividing direction coincides with the vehicle left-right direction, so that cost can be reduced as compared with a case of molding individually.

(4) The first conduit front portion 111 and the second conduit front portion 121 constitute the conduit front portion 103 molded as an integral component, and in the conduit front portion 103, the first conduit front portion 111 and the second conduit front portion 121 do not overlap each other in the vehicle vertical direction.

As a result, the conduit front portion 103 can be integrally molded by a mold whose mold dividing direction is set in a direction intersecting the vehicle left-right direction, that is, a direction inclined downward toward the front side in the present embodiment, so that cost can be reduced as compared with a case of molding individually.

(5) At least one of the first conduit rear portion 112 or the second conduit rear portion 122 includes a cross-sectional shape orthogonal to an extending direction longer in the vehicle left-right direction than in the vehicle vertical direction.

As a result, while maintaining a flow path area, a space required for arranging the first conduit rear portion 112 and the second conduit rear portion 122 can be made compact not only in the vehicle left-right direction but also in the vehicle vertical direction, and the first conduit rear portion 112 and the second conduit rear portion 122 can be more easily disposed below the vehicle body floor 135.

(6) The first conduit 110 further includes the first connection portion 113 that connects the first conduit front portion 111 and the first conduit rear portion 112, the second conduit 120 further includes the second connection portion 123 that connects the second conduit front portion 121 and the second conduit rear portion 122, and the first connection portion 113 is different in position in the vehicle front-rear direction from the second connection portion 123.

As a result, the first connection portion 113 and the second connection portion 123, which are likely to be large in size in a radial direction, are disposed at different positions in the front-rear direction. As compared with a case where both the connection portions 113 and 123 are disposed, at the same position in a front-rear direction, it is easy to make a space required for disposing the first conduit rear portion 112 and the second conduit rear portion 122 compact. Furthermore, since the first connection portion 113 and the second connection portion 123 are not arranged vertically below the vehicle body floor 135, it is easy to prevent a space for disposing the first conduit rear portion 112 and the second conduit rear portion 122 from increasing in a vertical direction.

(7) The vehicle body floor 135 includes the tunnel 136 that bulges upward from a substantially central portion in the vehicle width direction and extends in the vehicle front-rear direction, the tunnel space 138 is defined inside and below the tunnel 136, the first connection portion 113 is located in the tunnel space 138, and the second connection portion 123 is located in the bonnet space Z.

As a result, while maintaining a flow path area, a space required for arranging the first conduit rear portion 112 and the second conduit rear portion 122 can be made compact not only in the vehicle left-right direction but also in the vehicle vertical direction, and the first conduit rear portion 112 and the second conduit rear portion 122 can be easily disposed in the tunnel space 138.

(8) The first connection portion 113 includes a circular shape whose cross-sectional shape orthogonal to an extending direction is constant in radius, and the second conduit rear portion 122 is located below the first conduit rear portion 112 in the tunnel space 138, and a cross-sectional shape orthogonal to an extending direction of a portion facing a lower side of the first connection portion 113 is longer in the vehicle left-right direction than in the vehicle vertical direction.

As a result, in the tunnel space 138, it is easier to prevent dimension in a vertical direction of the space in which the first connection portion 113 and the second conduit rear portion 122 are disposed from increasing.

(9) The second conduit front portion 121 extends in a direction inclined downward toward the rear side in the bonnet space Z, the second conduit rear portion 122 extends in the vehicle front-rear direction in the tunnel space 138, and the second connection portion 123 is a bellows-shaped pipe and extends in a direction inclined downward toward the rear side in the bonnet space Z.

As a result, the second conduit front portion 121 and the second conduit rear portion 122 having different extending directions can be assembled by using the second connection portion 123 which is a bellows-shaped pipe, for example, by contracting and bending the second connection portion 123, so that assembling workability of the second conduit front portion 121 and the second conduit rear portion 122 is improved.

(10) One of the first conduit 110 and the second conduit 120 is included in the engine intake duct 43, and the other of the first conduit 110 and the second conduit 120 is included in the CVT intake duct 27.

As a result, the embodiment according to the present disclosure can be suitably implemented in a case where the first conduit 110 and the second conduit 120 are the engine intake duct 43 and the CVT intake duct 27 which are likely to be large in size.

(11) Since at least a part of the transmission 30, the intake pipe 41, the air cleaner 42, the exhaust pipe 51, or the exhaust muffler 52 is located in the region Y where the engine body 10 is projected in the front-rear direction, the powertrain mechanism 7 of the vehicle is compactly disposed in the vehicle width direction and the vertical direction. In this manner, the vehicle 100 is compactly configured in the vehicle width direction and the vertical direction.

(12) Since the seat 6 is located further to the front than the engine body 10, the transfer of heat generated from the engine body 10 to the seat 6 is suppressed. In this manner, the discomfort for a person seated in the seat 6 caused by the heat from the engine body 10 is suppressed.

(13) Since the vehicle 100 is a utility vehicle, the above effect of the disclosure is preferably exhibited. That is, it is easy to make the height of the cargo bed low while making the dimensions of the utility vehicle in the vehicle width direction compact.

(14) Since the exhaust port 14*b* is provided in a rear portion of the cylinder head 14, when the exhaust system related parts (for example, the exhaust muffler 52), which have a relatively high temperature, are disposed away from the seat 6 so as to suppress heat transfer to the seat 6 side, space occupied by a pipe (for example, the exhaust pipe 51) connecting these parts and the cylinder head 14 can be reduced. In this manner, it is easy to compactly configure the powertrain mechanism 7 in the vertical direction and the left-right direction while suppressing the discomfort for an occupant.

(15) Since the air cleaner 42 is disposed under the seat 6, the air cleaner 42 can be disposed by utilizing the dead space under the seat 6, and the intake pipe 41 that connects the cylinder head 14 and the air cleaner 42 disposed on the front side of the cylinder head 14 can be configured to be short.

(16) Since the positions of the exhaust pipe 51 and the exhaust muffler 52 are different in the front-rear direction, the exhaust muffler 52 can be easily disposed further above as compared with the case where the exhaust pipe 51 and the exhaust muffler 52 are disposed overlapping in the vertical direction. In this manner, it is easy to suppress the intrusion of water into the engine body 10 through the tail pipe 52*c* of the exhaust muffler 52, and it is easy to suppress the contact of water to the exhaust pipe 51, which affects the engine performance by being cooled. Accordingly, it is easy to improve wading performance.

(17) Since the top portion 54*z* of the exhaust pipe 51 is located at almost the same height as the horizontal plane W2 passing through an upper end portion of the cylinder head 14 in the vertical direction, it is easy to suppress the contact of the exhaust pipe 51 with water more while the powertrain mechanism 7 is compactly configured in the vertical direction.

(18) Since an upper end portion of the exhaust muffler 52 is located at substantially the same height as the horizontal plane W2 passing through an upper end portion of the cylinder head 14 in the vertical direction, it is easy to dispose the exhaust muffler 52 further above. In this manner, it is further easier to suppress water intrusion into the exhaust muffler 52 while keeping the powertrain mechanism 7 compact in the vertical direction.

(19) Since a front end upper portion of the transmission 30 is adjacent to the left side of the upstream side exhaust pipe 51*a* (front half portion) of the exhaust pipe 51, the transmission 30 can be easily configured to be long in the vertical direction while interference with the exhaust pipe 51 is prevented. In this manner, the transmission 30 can be compactly configured in the front-rear direction.

(20) Since the second independent exhaust pipe 54B (that is, the CVT side exhaust pipe) curves to the opposite side (right side) to the CVT 20 immediately after the exhaust port 14*b*, it is easy to configure the exhaust pipe 51 in a manner that interference with the transmission 30 is prevented. Further, as compared with the case where the exhaust pipe 51 is curved toward the CVT 20 side, it is easy to lengthen the exhaust pipe 51 and improve the engine performance.

(21) Since an upper portion of the transmission 30 is inclined downward toward the rear, it is easier to further configure the exhaust pipe 51 so as to suppress interference with the transmission 30.

(22) Since the CVT exhaust duct 28 is located above the transmission 30 and below an upper end portion of the CVT housing 21, it is easy to compactly arrange the CVT exhaust duct 28 above the transmission 30. In this manner, rising of the height position of the cargo bed 8 is suppressed while the CVT exhaust duct 28 is provided.

(23) Since the engine auxiliary 71 is covered from the vehicle width direction by the auxiliary case 72, the engine auxiliary 71 can be protected from a foreign matter such as water and sand. In particular, the effect of the present disclosure is preferably exhibited in a case where the vehicle travels on a submerged road, an uneven terrain road, and the like.

(24) Since the auxiliary case 72 is provided with the auxiliary case intake pipe 72*a* and the auxiliary case exhaust pipe 72*b*, the engine auxiliary 71 accommodated in the auxiliary case 72 is effectively cooled.

(25) Since the air cleaner 42 is disposed so as to have the upper end located below the horizontal plane W2 passing through an upper end portion of the cylinder head 14, an increase in the dimension in the vertical direction of the powertrain mechanism 7 can be suppressed and the powertrain mechanism 7 can be easily accommodated in a limited space.

(26) Since the air cleaner 42 is disposed on the front side of the engine body 10 so as to extend over from the engine body 10 to the CVT 20 (the power transmission unit 210 and the driving force transmission unit 220) in the vehicle width direction, it is easy to increase the capacity of the air cleaner 42. Further, since the air cleaner 42 is located on the inner side (further right) in the vehicle width direction than a left end portion of the CVT 20, it is easy to compactly configure the powertrain mechanism 7 as a whole in the vehicle width direction. Therefore, it is easy to secure the mountability of the powertrain mechanism 7 on the vehicle 100 while configuring the air cleaner 42 to be large in the vehicle width direction.

(27) The air cleaner 42 is disposed on the front side with respect to the engine body 10 with space between them, and is disposed directly under the driver's seat 6A. In this manner, it is easy to suppress heat transfer from the engine body 10 to the air cleaner 42. Further, it is easy to access the air cleaner 42 from seat 6 and maintainability is excellent. Further, since the air cleaner 42 is disposed directly under the driver's seat 6A, the space below the passenger seat 6B can be configured as, for example, a storage space.

(28) Since the exhaust pipe 51 passes through a region on the outer side (further right) in the vehicle width direction than the cylinder head cover 15, it is easy to lengthen the exhaust pipe 51. Further, since the exhaust pipe 51 extends more to the inner side (further left) in the vehicle width direction than an outer end portion (right end portion) in the vehicle width direction of the auxiliary transmission unit 230 (the auxiliary case 72, the engine auxiliary unit 70, and the power transmission unit 210), it is easy to compactly configure the powertrain mechanism 7 as a whole in the vehicle width direction. That is, deterioration in the mountability of the powertrain mechanism 7 on the vehicle 100 can be suppressed while the exhaust length is lengthened.

(29) The exhaust muffler 52 is connected to a downstream portion of the exhaust pipe 51, and the exhaust muffler 52 has the muffler inlet portion 52*b* (connection portion) connected to the exhaust pipe 51 on the front surface and in a left end portion. In this manner, the exhaust pipe 51 can be extended in an S-shape, and the length of the exhaust pipe can be easily increased. Further, the exhaust muffler 52 and the exhaust pipe 51 can be easily disposed in the front-rear direction, and the exhaust muffler 52 can be easily disposed so that the upper end is located above the lower end of the exhaust pipe 51. Furthermore, since the exhaust muffler 52 can be disposed behind the exhaust pipe 51, influence of temperature of the exhaust muffler 52 on the engine body 10 and other units is reduced.

In the above embodiment, the case where the air box 46 is interposed between the throttle body 45 and the air cleaner 42 is described as an example. However, the air box 46 is not necessarily needed. That is, the throttle body 45 and the air cleaner 42 may be configured to be directly connected by an air pipe.

Further, in the above embodiment, the case where the exhaust pipe 51 and the exhaust muffler 52 are directly connected is described as an example. However, another exhaust pipe may be interposed between the exhaust pipe 51 and the exhaust muffler 52, so that the exhaust pipe 51 and the exhaust muffler 52 are configured to be indirectly connected.

What is claimed is:

1. A vehicle comprising:

a vehicle body floor;

a bonnet space located on a front side in a vehicle front-rear direction with respect to the vehicle body floor;

a first conduit extending from the bonnet space toward a rear side in the vehicle front-rear direction below the vehicle body floor, the first conduit including a first conduit front portion located on a front side and a first conduit rear portion located on a rear side with respect to the first conduit front portion; and a second conduit extending from the bonnet space toward a rear side in the vehicle front-rear direction below the vehicle body floor, the second conduit including a second conduit front portion located on a front side and a second conduit rear portion located on a rear side with respect to the second conduit front portion, wherein the first conduit rear portion and the second conduit rear portion are arranged in a vehicle vertical direction below the vehicle body floor, wherein in the bonnet space, the first conduit front portion and the second conduit front portion extend in a direction inclined downward toward a rear side, and are arranged in a vehicle left-right direction, and wherein one of the first conduit and the second conduit is included in an engine intake duct, and the other of the first conduit and the second conduit is included in a CVT intake duct.

2. A vehicle comprising:

a vehicle body floor;

a bonnet space located on a front side in a vehicle front-rear direction with respect to the vehicle body floor;

a first conduit extending from the bonnet space toward a rear side in the vehicle front-rear direction below the vehicle body floor, the first conduit including a first conduit front portion located on a front side and a first conduit rear portion located on a rear side with respect to the first conduit front portion; and a second conduit extending from the bonnet space toward a rear side in the vehicle front-rear direction below the vehicle body floor, the second conduit including a second conduit front portion located on a front side and a second conduit rear portion located on a rear side with respect to the second conduit front portion, wherein the first conduit rear portion and the second conduit rear portion are arranged in a vehicle vertical direction below the vehicle body floor, wherein the first conduit rear portion and the second conduit rear portion are together molded as an integral component so as to constitute a conduit rear portion, and in the conduit rear portion, the first conduit rear portion and the second conduit rear portion do not overlap each other in a vehicle left-right direction.

3. A vehicle comprising:

a vehicle body floor;

a bonnet space located on a front side in a vehicle front-rear direction with respect to the vehicle body floor;

a first conduit extending from the bonnet space toward a rear side in the vehicle front-rear direction below the vehicle body floor, the first conduit including a first conduit front portion located on a front side and a first conduit rear portion located on a rear side with respect to the first conduit front portion; and a second conduit extending from the bonnet space toward a rear side in the vehicle front-rear direction below the vehicle body floor, the second conduit including a second conduit front portion located on a front side and a second conduit rear portion located on a rear side with respect to the second conduit front portion, wherein the first conduit rear portion and the second conduit rear portion are arranged in a vehicle vertical direction below the vehicle body floor, wherein the first conduit front portion and the second conduit front portion are together molded as an integral component so as to constitute a conduit front portion, and in the conduit front portion, an entirety of the first conduit front portion and an entirety of the second conduit front portion do not overlap each other in the vehicle vertical direction.

4. The vehicle according to claim 1, wherein at least one of the first conduit rear portion or the second conduit rear portion includes a cross-sectional shape that is orthogonal to an extending direction of the at least one of the first conduit rear portion or the second conduit rear portion, the cross-sectional shape having a dimension in a vehicle left-right direction that is greater than a dimension of the cross-sectional shape in the vehicle vertical direction.

5. A vehicle comprising:

a vehicle body floor;

a bonnet space located on a front side in a vehicle front-rear direction with respect to the vehicle body floor;

a first conduit extending from the bonnet space toward a rear side in the vehicle front-rear direction below the vehicle body floor, the first conduit including a first conduit front portion located on a front side and a first conduit rear portion located on a rear side with respect to the first conduit front portion; and a second conduit extending from the bonnet space toward a rear side in the vehicle front-rear direction below the vehicle body floor, the second conduit including a second conduit front portion located on a front side and a second conduit rear portion located on a rear side with respect to the second conduit front portion, wherein the first conduit rear portion and the second conduit rear portion are arranged in a vehicle vertical direction below the vehicle body floor, wherein the first conduit further includes a first connection portion that connects the first conduit front portion and the first conduit rear portion, the second conduit further includes a second connection portion that connects the second conduit front portion and the second conduit rear portion, and the first connection portion is different in position in the vehicle front-rear direction from the second connection portion.

6. The vehicle according to claim 5, wherein the vehicle body floor includes a tunnel that bulges upward from a substantially central portion in a vehicle width direction and extends in the vehicle front-rear direction, a tunnel space is defined inside and below the tunnel, the first connection portion is located in the tunnel space, and the second connection portion is located in the bonnet space.

7. The vehicle according to claim 6, wherein the first connection portion includes a circular shape whose cross-sectional shape orthogonal to an extending direction is constant in radius, and the second conduit rear portion is located below the first conduit rear portion in the tunnel space, and a cross-sectional shape orthogonal to an extending direction of a portion facing a lower side of the first connection portion is longer in a vehicle left-right direction than in the vehicle vertical direction.

8. The vehicle according to claim 6, wherein the second conduit front portion extends in a direction inclined downward toward a rear side in the bonnet space, the second conduit rear portion extends in the vehicle front-rear direction in the tunnel space, and the second connection portion is a bellows-shaped pipe and extends in a direction inclined downward toward the rear side in the bonnet space.

* * * * *